US006629635B1

(12) United States Patent
Akamine

(10) Patent No.: US 6,629,635 B1
(45) Date of Patent: Oct. 7, 2003

(54) INFORMATION RECORDING MEDIUM, INFORMATION PROCESSING METHOD, INFORMATION PROCESSING APPARATUS, AND PROGRAM RECORDING MEDIUM

(75) Inventor: Yoshikazu Akamine, Kitatsuru-gun (JP)

(73) Assignee: Olympus Optical Co., Ltd., Tokyo (JP)

( * ) Notice: Subject to any disclaimer, the term of this patent is extended or adjusted under 35 U.S.C. 154(b) by 185 days.

(21) Appl. No.: 09/722,942

(22) Filed: Nov. 27, 2000

(30) Foreign Application Priority Data

Nov. 29, 1999 (JP) .......................................... 11-338465
Nov. 20, 2000 (JP) ...................................... 2000-353146

(51) Int. Cl.$^7$ .......................... G06K 7/10; G06F 17/00; G06F 7/08
(52) U.S. Cl. ........................ 235/375; 235/454; 235/381
(58) Field of Search ................................ 235/375, 380, 235/462.01–462.25, 492, 494, 454, 383, 381

(56) References Cited

U.S. PATENT DOCUMENTS 4,369,442 A * 1/1983 Werth et al. ................ 194/217
5,171,977 A * 12/1992 Morrison .................... 235/375
5,220,543 A * 6/1993 Kuroda et al. ........... 369/13.34
6,131,127 A * 10/2000 Gafken et al. ................. 710/1
6,148,331 A * 11/2000 Parry .......................... 283/70
2001/0019325 A1 * 9/2001 Takekawa ................... 345/157
2002/0039457 A1 * 4/2002 Helms et al. ............... 382/305

* cited by examiner

*Primary Examiner*—Thien M. Le
(74) *Attorney, Agent, or Firm*—Frishauf, Holtz, Goodman & Chick, P.C.

(57) ABSTRACT

A recording medium records a dot code defined by a matrix of dots recorded by typing or printing. The dot code includes a dot code decode control file including one or more of a control program and parameter used to control an application program which runs on a PC that receives digital information sent from a code reader that reads the dot code recorded on the recording medium, and an application data file such as an audio file or the like to be used or reproduced by the application program which runs on the PC.

22 Claims, 17 Drawing Sheets

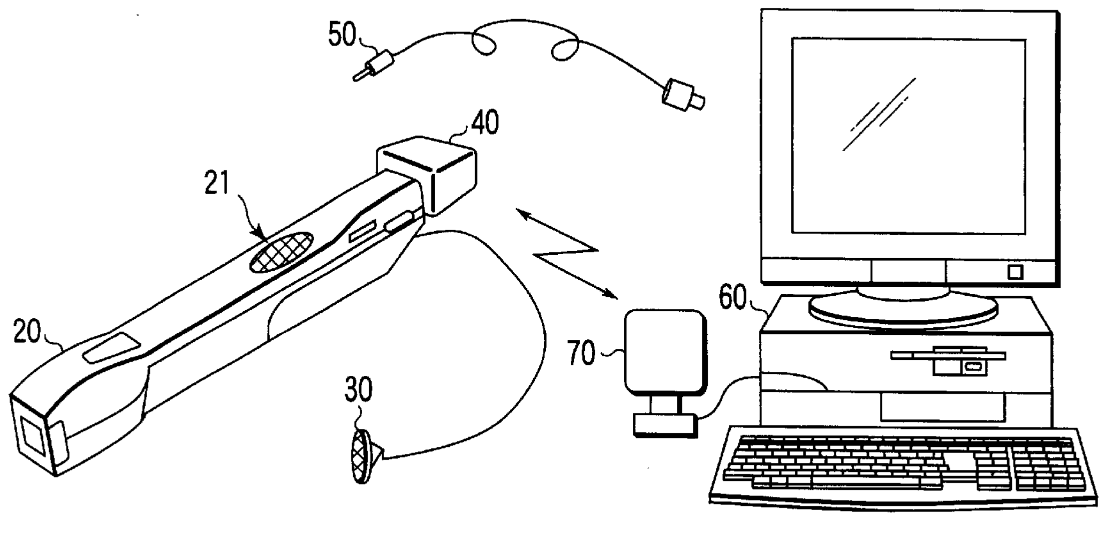
F I G. 3
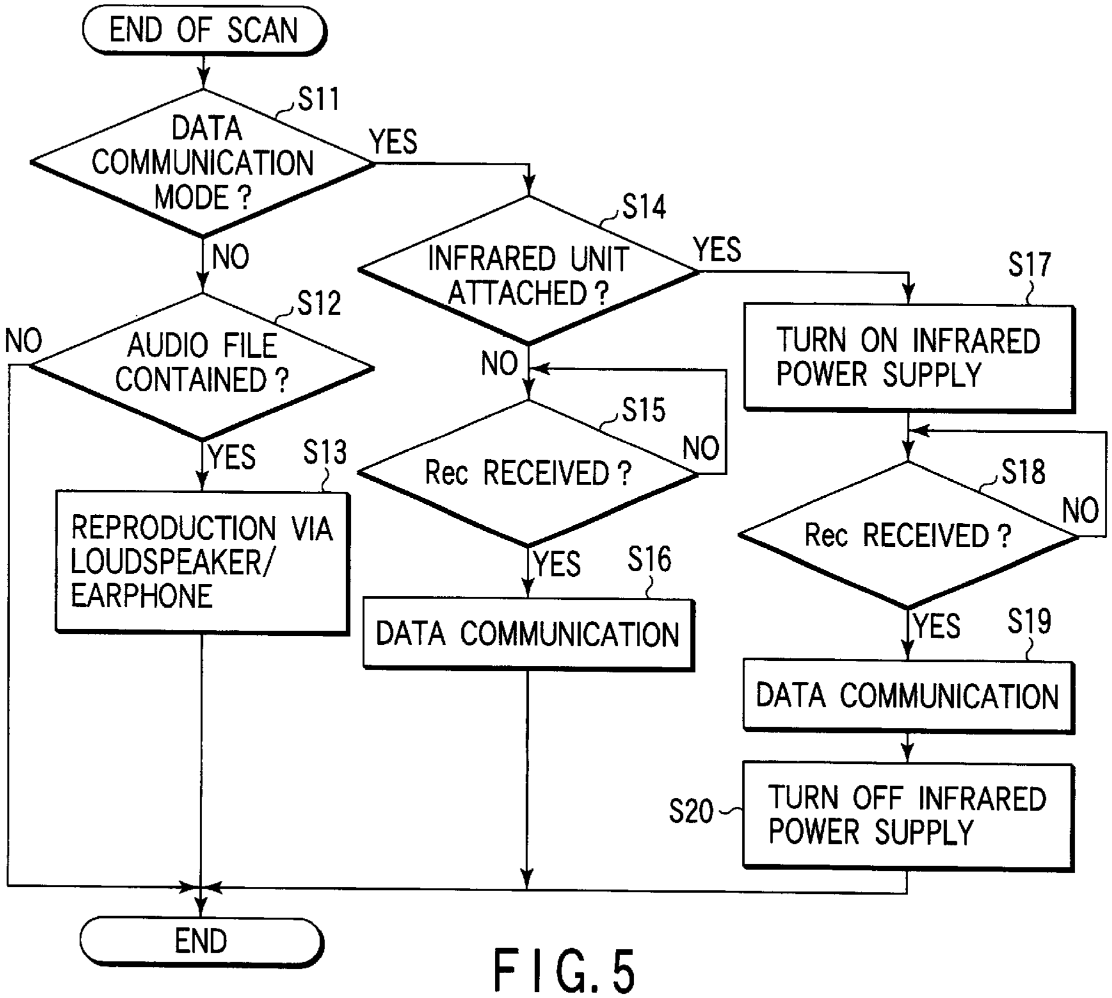
F I G. 5

```
<HTML>
<BODY BGCOLOR=#FFFF80 TEXT=#0000FF>
<Ht>JAPANESE CRANE</H1></HR>
<BGSOUND SRC="tanon.wav" LOOP=3>
<IMG DYNSRC="file:///EI/DATA/VA000038.AVI" LOOP=5
BORDER=20 ALIGN="left">
NAME : JAPANESE CRANE<P>
FAMILY NAME : GRUIDAE<P>
APPEARANCE : WINDSPREAD=65cm.<BR>
WHITE BODY, RED-CROWNED HEAD, AND BLACK NECK
AND WING FEATHER.<P>
HABITAT : BREED IN SOUTHEASTERN SIBERIA. NORTHEASTERN
NORTHEAST SECTION IN CHINA, AND THE LIKE,<BR>
MIGRATE TO CHINA AND KOREA PENINSULA IN<BR>
WINTER. ABOUT 600 CRANES INHABIT WHOLE YEAR<BR>
AROUND KUSHIRO MARSHLAND, HOKKAIDO, JAPAN.<P>
FEATURE : THEY PERFORM SO-CALLED CRANE DANCES BY<BR>
LEAPING AND JUMPING AT THE BEGINNING OF<BR>
BREEDING SEASON. <FONT COLOR=#FF0000>ENDANGERED SPECIES.
</FONT><P><HR>
INTERNET EXPLORER IS PREFERRED TO VIEW THIS PAGE.
</BODY>
</HTML>
```

tanncho.htm

AVI FILE ON CD-ROM

EXECUTION RESULT OF tanncho.htm

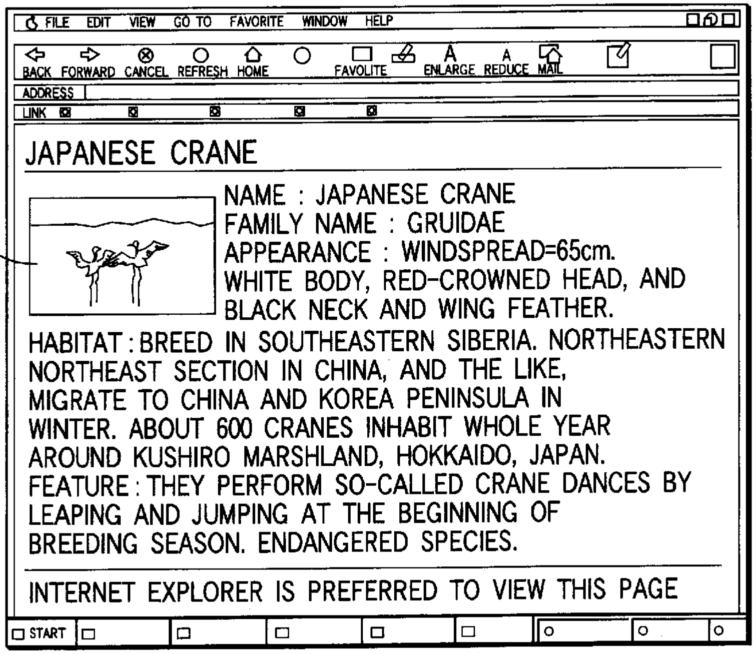

FIG. 9

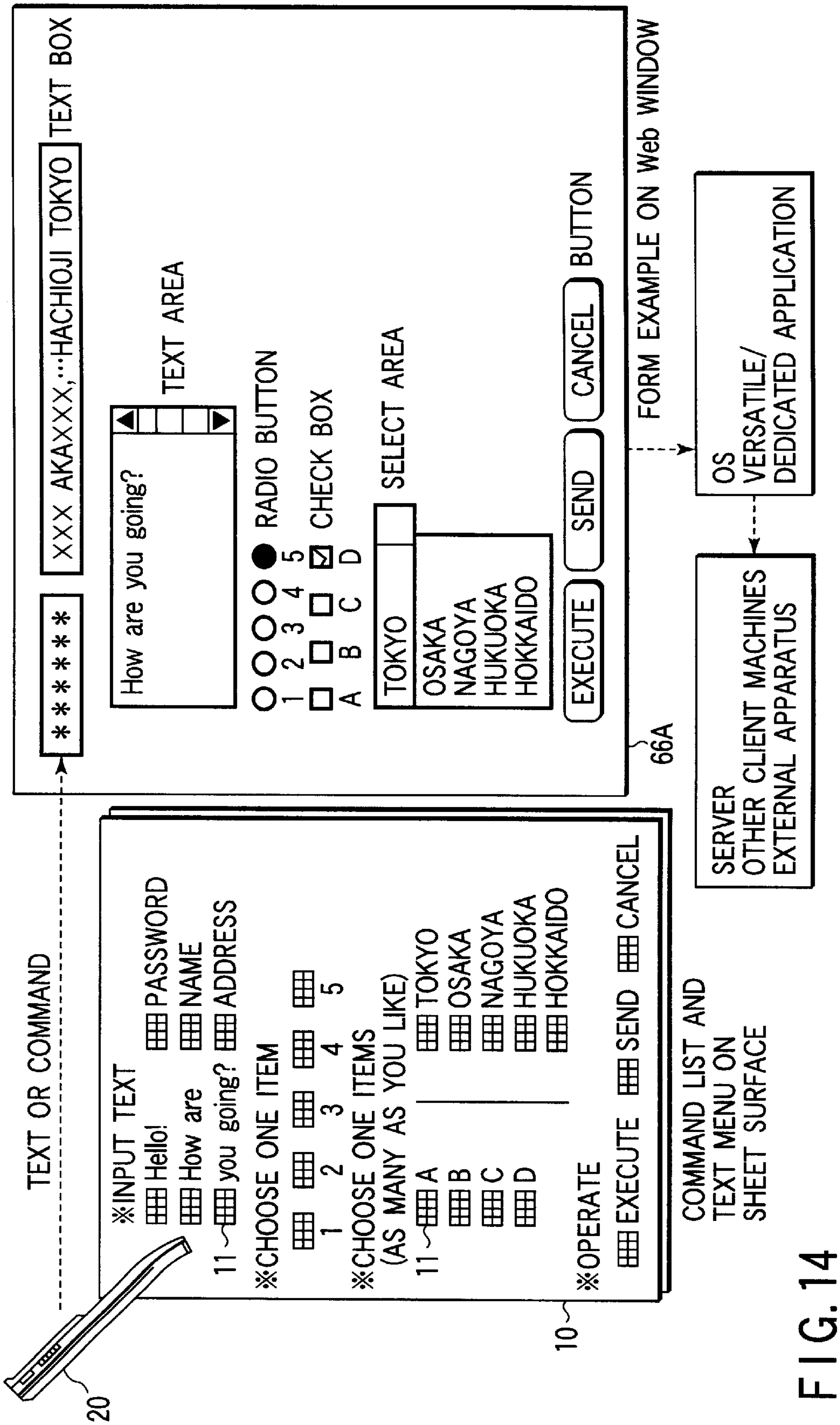
F I G. 14

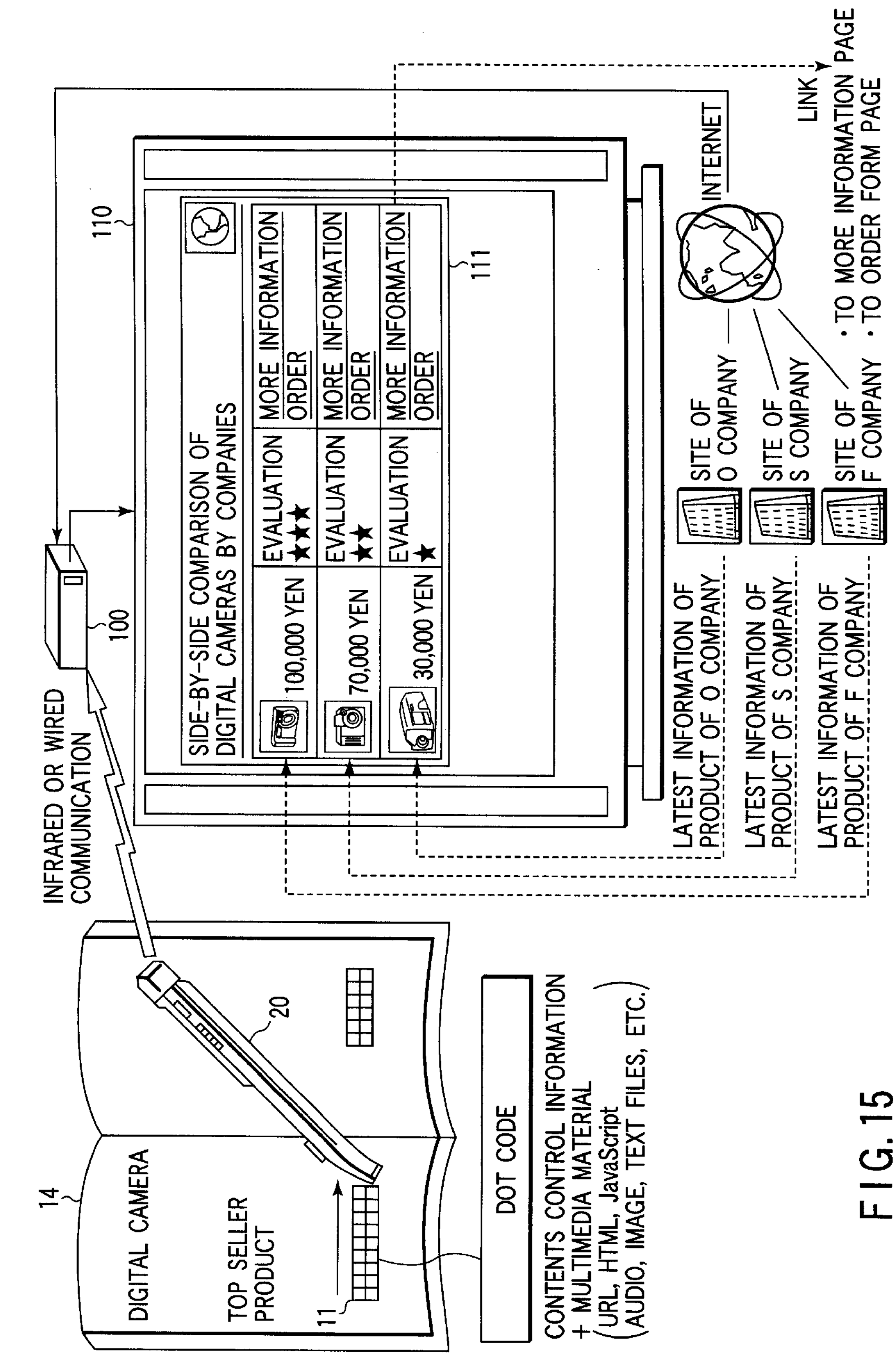
F I G. 15

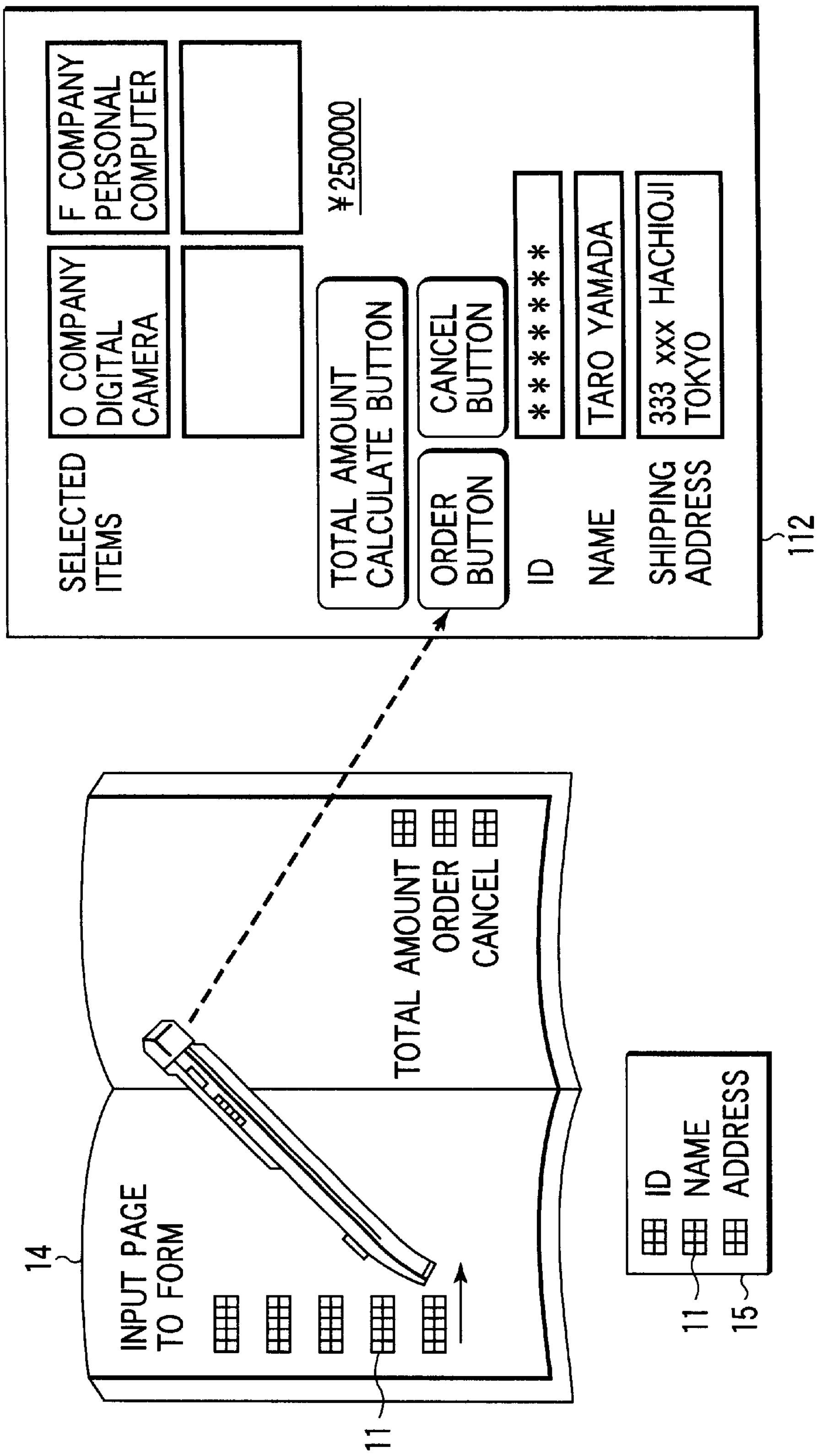
F I G. 16

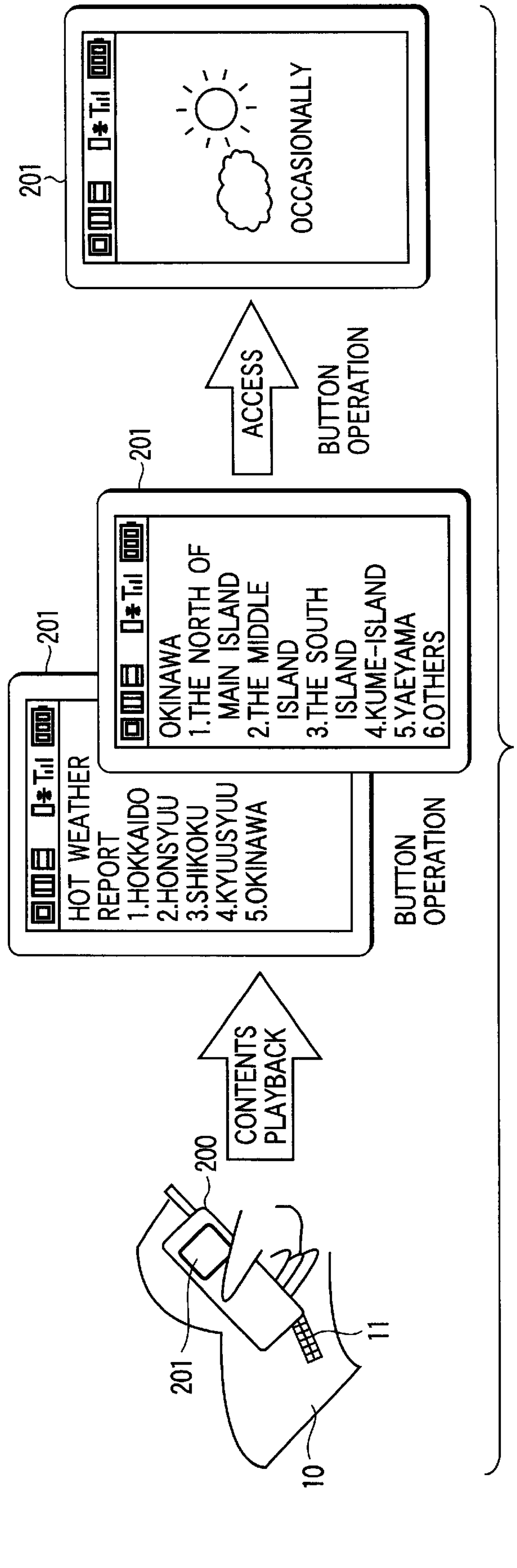
F I G. 21
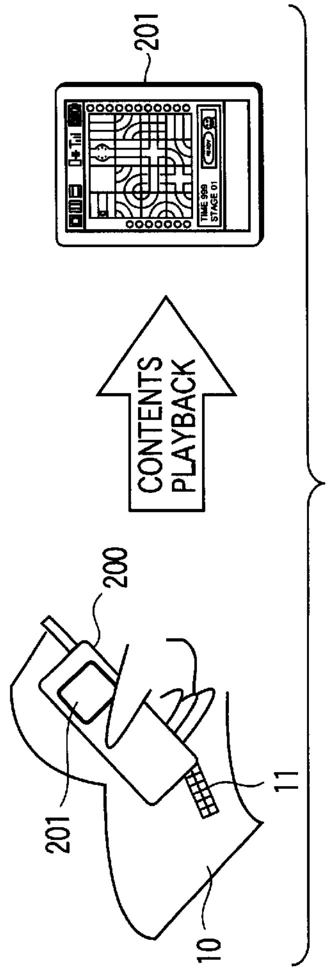
F I G. 22

INFORMATION RECORDING MEDIUM, INFORMATION PROCESSING METHOD, INFORMATION PROCESSING APPARATUS, AND PROGRAM RECORDING MEDIUM

CROSS-REFERENCE TO RELATED APPLICATIONS

This application is based upon and claims the benefit of priority from the prior Japanese Patent Applications No. 11-338465, filed Nov. 29, 1999; and No. 2000-353146, filed Nov. 20, 2000, the entire contents of which are incorporated herein by reference.

BACKGROUND OF THE INVENTION

The present invention relates to an optically readable information recording medium on which digital information is recorded as a dot pattern defined by a matrix of dots which are recorded by printing. Also, the present invention relates to an information processing method for reading and reproducing the dot pattern from such information recording medium, an information processing apparatus for reading the dot pattern from the information recording medium, and a program recording medium which stores a program for making a computer operate as the information processing apparatus.

Various image recording methods and apparatuses for printing, on a sheet-like print medium such as a paper sheet, film, or the like, a readable image such as a character, symbol, figure, pattern, photo, image, computer graphic image, or the like that a person can visually and directly read, and an optically readable audio encoded image which includes a one- or two-dimensional barcode obtained by encoding audio data have been proposed.

For example, these methods and apparatuses are disclosed in Jpn. Pat. Appln. KOKAI Publication No. 60-244146, U.S. Pat. Nos. 5,896,403, 6,544,557, Jpn. Pat. Appln. KOKAI Publication No. 10-51645 (corresponding to U.S. patent application Ser. No. 08/900,959), and the like.

According to the techniques disclosed in these references, since audio is printed on a sheet surface, a readable image and audio can be integrated on that sheet surface. By reading that audio encoded image using a dedicated reader, the user can easily hear audio while observing the readable image.

Especially, U.S. Pat. Nos. 5,896,403, 6,544,557, and Jpn. Pat. Appln. KOKAI Publication No. 10-51645 disclose a technique that encodes data such as audio data or the like to a dot code as an audio encoded image which can be easily optically read by a manual scan and prints that image on a sheet-like print medium such as a paper sheet or the like together with a readable image.

FIG. 1 shows the physical format of the dot code.

That is, a dot code 1 is formed by two-dimensionally arranging a plurality of blocks 2 at neighboring positions. Each block 2 is defined by a data dot pattern portion 3 in which data obtained by braking up audio data to be recorded in units of blocks are present as a predetermined two-dimensional matrix of dot images of black dots or white dots (white as the background color of a print medium is often directly read in practice) corresponding to "1" or "0" as their values, markers 4 which are located at the four corners of each block to be used to find a reference point for reading dots (dot data) in the data dot pattern portion 3 and has a given run of black dots, and a block address pattern 5 which is located between neighboring markers to be able to identify the plurality of different blocks upon reading and includes an error detection or correction code.

According to this dot code 1, even when the entire size is larger than an image sensing field 6 of the reader, in other words, even when the dot code 1 cannot be sensed by the reader by one shot, entire original data can be reconstructed from data included in the individual blocks as long as addresses assigned to the blocks 2 can be detected in units of blocks together with data dots included in each block.

Therefore, audio data or the like can be actually recorded on a sheet surface, and the recorded data can be easily read even by a manual scan.

Such dot code can include so-called multimedia information including image data, video data, text data, and the like in an optically readable format in addition to the aforementioned audio data.

As an apparatus that processes such multimedia information, a personal computer (PC) is well known.

Multimedia information recorded as a dot code may be sent to the PC, and may be reproduced on the PC.

However, since collaboration between the dot code and PC has not been satisfactorily examined, some problems remain unsolved.

For example, in order to reproduce multimedia information recorded as a dot code, the PC must have all control programs, parameters, and application data files which are expected to be used.

The operator must start an application program for reproduction in advance.

BRIEF SUMMARY OF THE INVENTION

The present invention has been made in consideration of the conventional problems, and has as its object to provide an information recording medium, which allows the PC to reproduce multimedia information read from a dot code even when the PC does not have all control programs, parameters, and application data files which are expected to be used.

It is another object of the present invention to provide an information processing method and apparatus, which can reproduce multimedia information even when the operator does not start an application program for reproduction in advance, and a program recording medium which stores a program for making a program answer apparatus such as a computer operate as such information processing apparatus.

According to a first aspect of the present invention, there is provided an information recording medium having a portion which records data corresponding to audio information, image information, text information, or the like as an optically readable code, the code comprising:

- information for controlling an external apparatus that processes digital information in accordance with an application program to designate and start the application program; and
- a data file used by the started application program.

According to a second aspect of the present invention, there is provided an information recording medium having a portion which records data corresponding to audio information, image information, text information, or the like as an optically readable code, the code comprising:

- a control file for designating and controlling an application program in an external apparatus which processes digital information in accordance with the application program; and a data file processed in accordance with the designated application program.

According to a third aspect of the present invention, there is provided an information processing method for optically reading, from an information recording medium having a portion which records data corresponding to audio information, image information, text information, or the like as an optically readable code, the code, and reproducing the information, the code including:

information for controlling an external apparatus that processes digital information in accordance with an application program to designate and start the application program; and a data file used by the started application program, the method comprising the steps of:

optically reading the code;

reproducing the information for designating and starting the application program and the data file from the read code;

designating and starting a corresponding application program in accordance with the reproduced information for designating and starting the application program; and passing the reproduced data file to the started application program.

According to a fourth aspect of the present invention, there is provided an information processing apparatus for optically reading, from an information recording medium having a portion which records data corresponding to audio information, image information, text information, or the like as an optically readable code, the code, and reproducing the information, the code including:

information for controlling an external apparatus that processes digital information in accordance with an application program to designate and start the application program; and a data file used by the started application program, the apparatus comprising:

reading means for optically reading the code;

reproduction means for reproducing the information for designating and starting the application program and the data file from the code read by the reading means;

starting means for designating and starting a corresponding application program in accordance with the information for designating and starting the application program, which is reproduced by the reproduction means; and means for passing the reproduced data file to the application program started by the starting means.

According to a fifth aspect of the present invention, there is provided a computer readable program recording medium which stores a program including a command for making a computer execute:

a process for optically reading, from an information recording medium having a portion which records data corresponding to audio information, image information, text information, or the like as an optically readable code, the code, and reproducing the information, the code including information for controlling an external apparatus that processes digital information in accordance with an application program to designate and start the application program, and a data file used by the started application program;

a process for reproducing the information for designating and starting the application program and the data file from the read code;

a process for designating and starting a corresponding application program in accordance with the reproduced information for designating and starting the application program; and a process for passing the reproduced data file to the started application program.

According to a sixth aspect of the present invention, there is provided an information processing method for optically reading, from an information recording medium having a portion which records data corresponding to audio information, image information, text information, or the like as an optically readable code, the code, and reproducing the information, the code including:

a control file for designating and controlling an application program in an external apparatus which processes digital information in accordance with the application program; and a data file processed in accordance with the designated application program, the method comprising the steps of:

optically reading the code;

reproducing the control file and the data file from the read code;

designating and controlling a corresponding application program in accordance with the reproduced control file; and passing the reproduced data file to the controlled application program.

According to a seventh aspect of the present invention, there is provided an information processing apparatus for optically reading, from an information recording medium having a portion which records data corresponding to audio information, image information, text information, or the like as an optically readable code, the code, and reproducing the information, the code including:

a control file for designating and controlling an application program in an external apparatus which processes digital information in accordance with the application program; and a data file processed in accordance with the designated application program, the apparatus comprising:

reading means for optically reading the code;

reproduction means for reproducing the control file and the data file from the code read by the reading means;

control means for designating and controlling a corresponding application program in accordance with the control file reproduced by the reproduction means; and means for passing the reproduced data file to the application program controlled by the control means.

According to a eighth aspect of the present invention, there is provided a computer readable program recording medium which stores a program including a command for making a computer execute:

a process for optically reading, from an information recording medium having a portion which data corresponding to audio information, image information, text information, or the like as an optically readable code, the code, and reproducing the information, the code including a control file for designating and controlling an application program in an external apparatus which processes digital information in accordance with the application program, and a data file processed in accordance with the designated application program;

a process for reproducing the control file and the data file from the read code;

a process for designating and controlling a corresponding application program in accordance with the reproduced control file; and a process for passing the reproduced data file to the controlled application program.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a perspective view showing a code reader as an information reading apparatus according to the first embodiment and a PC as an information receiving apparatus;

FIG. 5 is a flow chart showing the operation after a scan of the code reader to explain data transmission from the code reader to the PC;

FIG. 9 is a view for explaining an example in which materials on a CD-ROM are read out and are reproduced on a browser;

FIG. 14 is a view for explaining operations for executing various operations by inputting text/commands in a form on a home page from a command list on a sheet surface;

FIG. 15 is a view for explaining a use state when the second embodiment is applied to an Internet mail-order service;

FIG. 16 is a view for explaining an input state in an order form;

FIG. 21 is a view for explaining a use state when the data file contents are a plurality of HTML files in the fourth embodiment; and FIG. 22 is a view for explaining a use state when the data file contents are Java applets in the fourth embodiment.

DETAILED DESCRIPTION OF THE INVENTION

Preferred embodiments of the present invention will be described hereinafter with reference to the accompanying drawings.

[First Embodiment]

Figure 1:
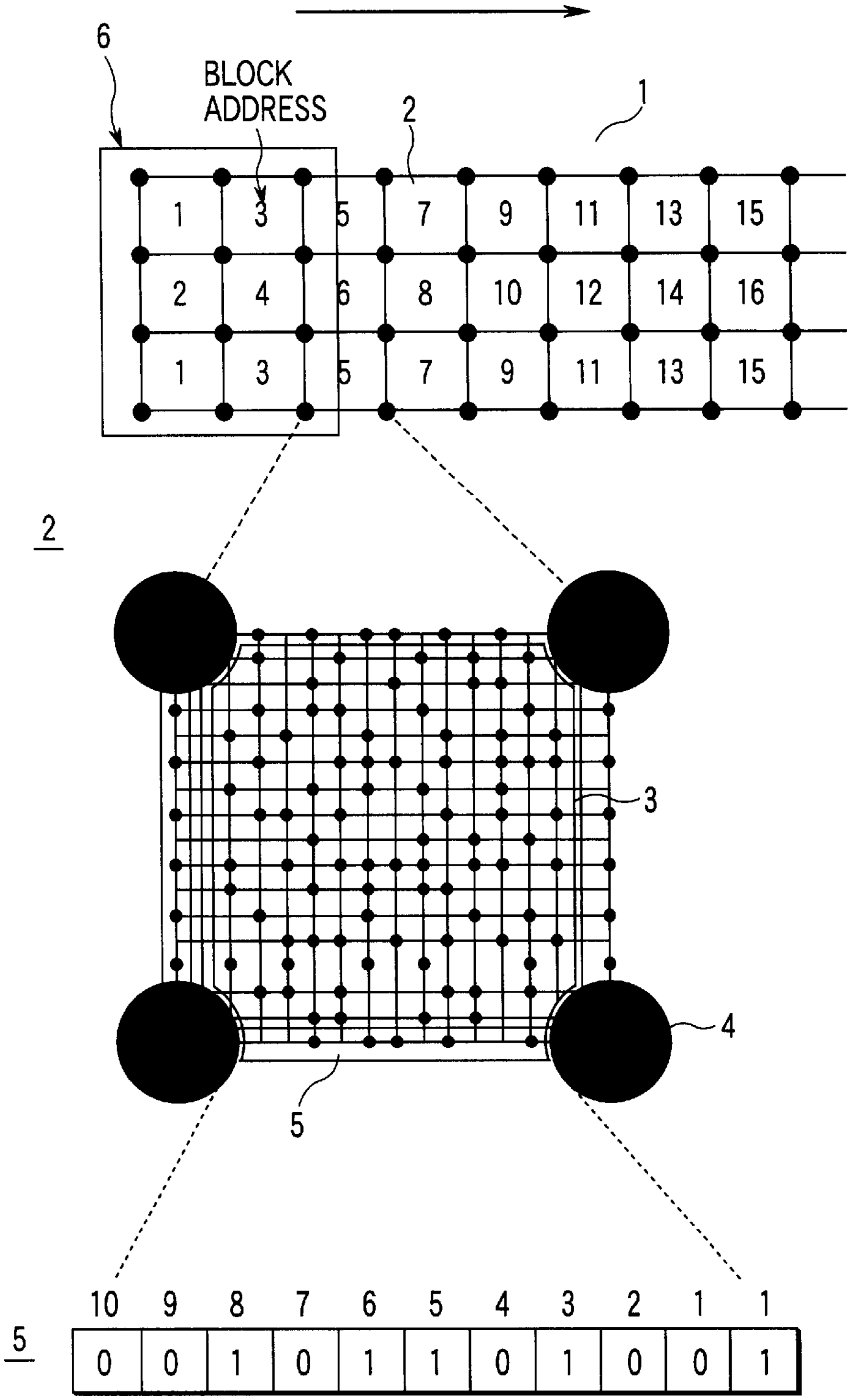
FIG. 1 shows the physical format of a dot code.
Figure 2:
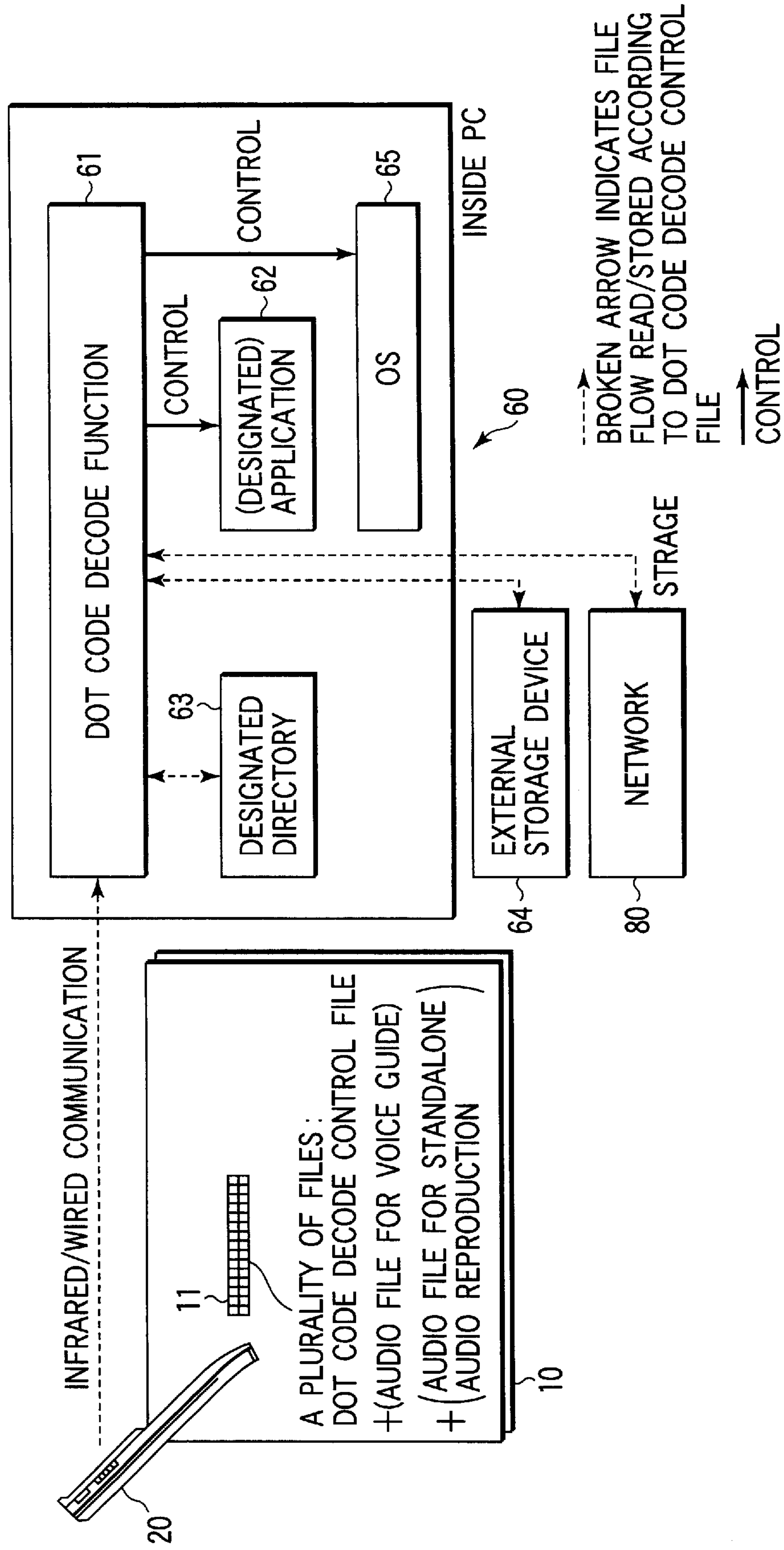
FIG. 2 is a diagram showing the arrangement according to the first embodiment of the present invention.

FIG. 2 shows the arrangement according to the first embodiment of the present invention.

More specifically, a dot code 11 as an optically readable dot code 1 is printed on a recording medium 10 such as a paper sheet, seal, or the like as an information recording medium according to the first embodiment of the present invention. The dot code 11 contains, for example, a plurality of files (multimedia information) such as a dot code decode control file, an audio file, and the like. Details of these files will be explained later.

The dot code 11 on such recording medium 10 is read by a code reader 20 when the user manually scans the dot code 11 using the code reader 20 as an information reading apparatus.

The code reader 20 comprises a loudspeaker 21 for reproducing and outputting an audio file for standalone audio reproduction included in the read dot code 11 as audio, as shown in FIG. 3. Also, the reader 20 comprises an earphone jack (not shown). When an earphone 30 is connected to that jack, audio is output from the earphone 30 in place of the loudspeaker 21. Furthermore, the code reader 20 comprises a communication jack (not shown) for receiving a detachable infrared unit 40 or RS232C cable 50 which is used to communicate with an external apparatus, and can send data of the read dot code 11 to the external apparatus.

Such external apparatus includes a personal computer (PC) 60. The RS232C cable 50 can be directly connected to a connector equipped on the PC 60. By contrast, when the infrared unit 40 is used, an external infrared unit 70 is used. The external infrared unit 70 is connected to the connector (not shown) of the PC 60 via an RS232C cable to exchange data, and receives operation power supply from a USB connector (not shown) of the PC 60 via a USB cable.

The code reader 20 and PC 60 constitute an information processing apparatus according to the first embodiment of the present invention.

More specifically, the PC 60 comprises a dot code decode function 61 of obtaining a dot code decode control file, an audio file for voice guidance, and the like from data sent from the code reader 20 via infrared or wired communications, as shown in FIG. 2. When the dot code decode function 61 can obtain an audio file or the like by decoding, it looks up attribute information (e.g., an extension) of that file, starts application software 62 assigned to each extension in advance, and executes that file. When the dot code decode control file is obtained, the function 61 stores the obtained files such as an audio file and the like in a designated directory 63 in an internal storage device such as a hard disk or the like (not shown) of the PC, in an external storage device 64 such as an MO, FD, or the like, or in an external device connected via a network 80 via designated by that dot code decode control file. Alternatively, the function 61 controls an OS 65 as the dot code decode control file describes, or it starts designated application software 62 and controls to pass the designated file to that application software 62 by a designated method (e.g., it passes data to a running program via a clipboard, etc.)

Figure 4:
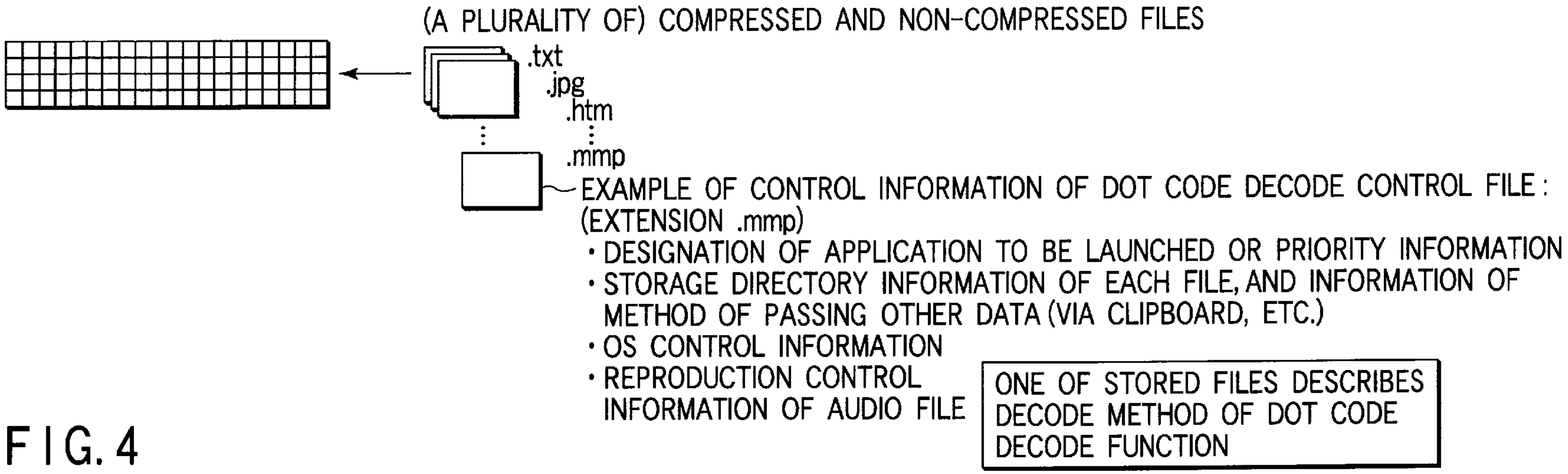
FIG. 4 is a view for explaining files included in a dot code shown in FIG. 2.

That is, the dot code 11 includes (a plurality of) compressed or non-compressed multimedia file(s) such as an audio file (e.g., an extension=".wav"), an image file (e.g., an extension=".jpg"), an HTML file (e.g., an extension=".htm"), and the like, and the dot code decode control file, as shown in FIG. 4. The dot code decode control file is assigned, e.g., an extension=".mmp". and describes a plurality of pieces of information such as designation or priority order information of applications to be started, destination directory information in units of files, information indicating the way other data are passed, OS control information, audio file reproduction control information, and the like.

Note that data is sent from the code reader 20 to the PC 60, as shown in FIG. 5.

More specifically, FIG. 5 is a flow chart showing the operation after a scan by the code reader 20. Upon completion of the scan, the code reader 20 checks if a data communication mode is set (step S11). The data communication mode is set when the infrared unit 40 or RS232C cable 50 is connected to the communication jack (not shown). This mode is automatically set by detecting connection of such unit or cable. Alternatively, when a setup switch is provided to allow the user to arbitrarily set that mode, the user may disable the data communication mode if the unit or cable is connected.

If the data communication mode is not set, the code reader 20 checks if the scanned dot code 11 includes an audio file (step S12). If no audio file is included, the processing ends. By contrast, if an audio file such as that for standalone audio reproduction or the like is included, the code reader reproduces and outputs that audio file via the loudspeaker 21 or earphone 30 (step S13).

On the other hand, if it is determined in step S11 that the data communication mode is set, the code reader 20 detects whether the device connected is the infrared unit 40 or RS232C cable 50 (step S14). The device connected may be automatically detected by a known method, or a selector switch may be provided, and the user's manual setup result using that switch may be detected.

If it is detected that the RS232C cable 50 is connected, the code reader 20 waits for reception of a request (Rec) signal from the PC 60 (step S15). More specifically, when the PC 60 outputs this Rec signal at predetermined time intervals (e.g., 700-msec intervals), it sends the Rec signal to the code reader 20 via the RS232C cable or external infrared unit 70 connected to its connector. Upon receiving the Rec signal via the RS232C cable 50, the code reader 20 makes data communications for sending the read data to the PC 60 (step S16) in response to that signal, and ends the processing upon completion of data transmission.

If it is detected in step S14 that the infrared unit 40 is connected, a power supply unit (not shown) of the code reader 20 begins to supply electric power to the infrared unit 40 (step S17). After that, the code reader 20 waits for reception of a request (Rec) signal from the PC 60 by the external infrared unit 70 (step S18) as in the case of the RS232C cable 50, and makes data communications via the infrared units 40 and 70 (step S19). Upon completion of data transmission, the code reader 20 stops power supply to the infrared unit 40 (step S20), and ends the processing.

Note that data to be sent from the code reader 20 to the PC 60 varies depending on the functions of the code reader 20 provided to the dot code decode function 61.

Figure 6:
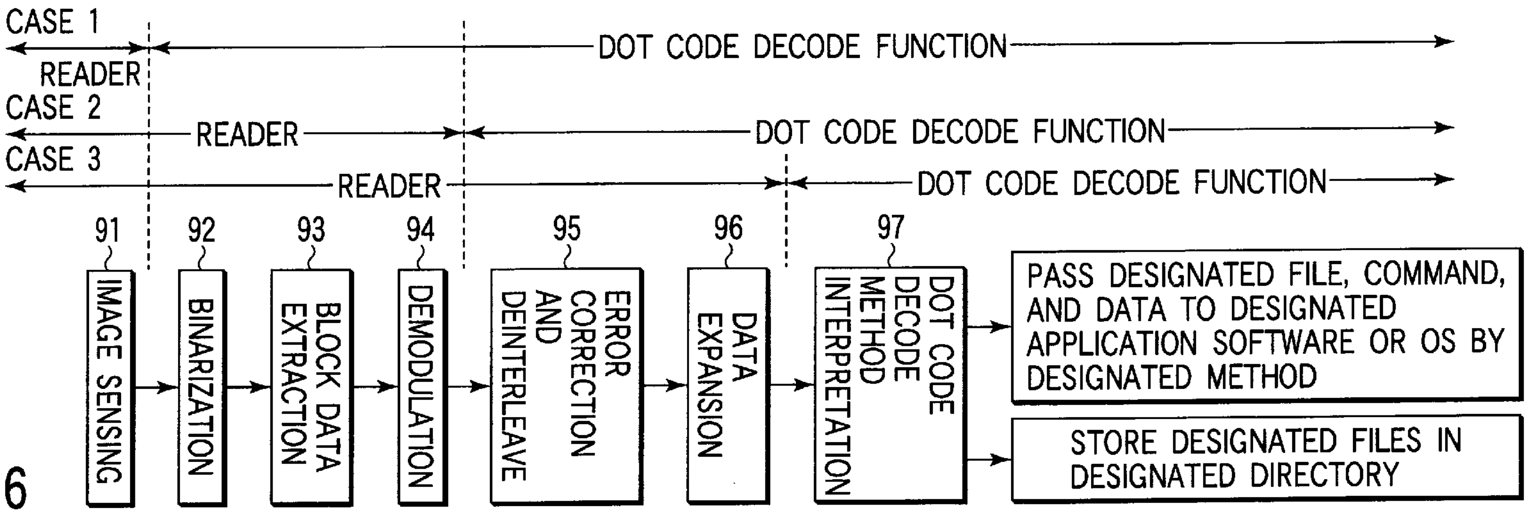
FIG. 6 is a view for explaining the functions included as a dot code decode function on the PC side.

More specifically, upon reading the dot code 1 as the dot code 11, an image sensing function 91 senses an image of the dot code 1, as shown in FIG. 6. A binarization function 92 binarizes image data obtained by image sensing, and a block data extraction function 93 extracts data by detecting individual data dot values in the data dot pattern portion 3 in each block 2 from the binarized image data. A demodulation function 94 demodulates the extracted data, and an error correction & deinterleave function 95 deinterleaves the demodulated data and executes error correction of the deinterleaved data. After that, a data expansion function 96 expands the error-corrected data, thus generating files. Since details of these functions are described in U.S. Pat. No. 5,896,403, a description thereof will be omitted.

A dot code decode method interpreter function 97 interprets the contents of the dot code decode file of the generated files, and stores a designated file in a designated directory or passes a designated file, command, or data to designated application software or OS by a designated method.

Of these functions, the code reader 20 comprises at least the image sensing function 91. More specifically, when the image sensing function 91 alone is provided to the code reader 20 and the binarization function 92 and subsequent functions are implemented by the dot code decode function 61 of the PC 60 (case 1), the code reader 20 sends image data to the PC 60. In this case, image data is transferred in real time. Of course, binarized image data may be sent in real time.

On the other hand, when the binarization function 91 to the demodulation function 94 are provided to the code reader 20, and the error correction & deinterleave function 95 and subsequent functions are implemented by the dot code decode function 61 of the PC 60 (case 2), the code reader 20 sends demodulated data to the PC 60. Of course, data that has undergone error correction and deinterleave may be sent.

When the binarization function 91 to the data expansion function 96 are provided to the code reader 20 and the dot code decode function 61 of the PC 60 has the dot code decode method interpreter function 97 alone (case 3), the code reader 20 sends expanded data to the PC 60.

An example of case 2 will be explained below with reference to FIGS. 7 and 8.

More specifically, a plurality of dot codes 11 are printed on a paper medium 12 as the recording medium 10. One of the dot codes 11 includes an HTML file (index.htm), gif image file (aaa.gif), natural image file (bbb.jpg), audio file (ccc.wav), and dot code decode control file (decode.mmp). Note that the dot code decode file describes a command for storing the files in a directory "c:\temp". a command for starting Internet Explorer Ver. 5.0 available from Microsoft Corp. as a Web browser, and a command for executing "index.htm" as an HTML file.

Figure 8:
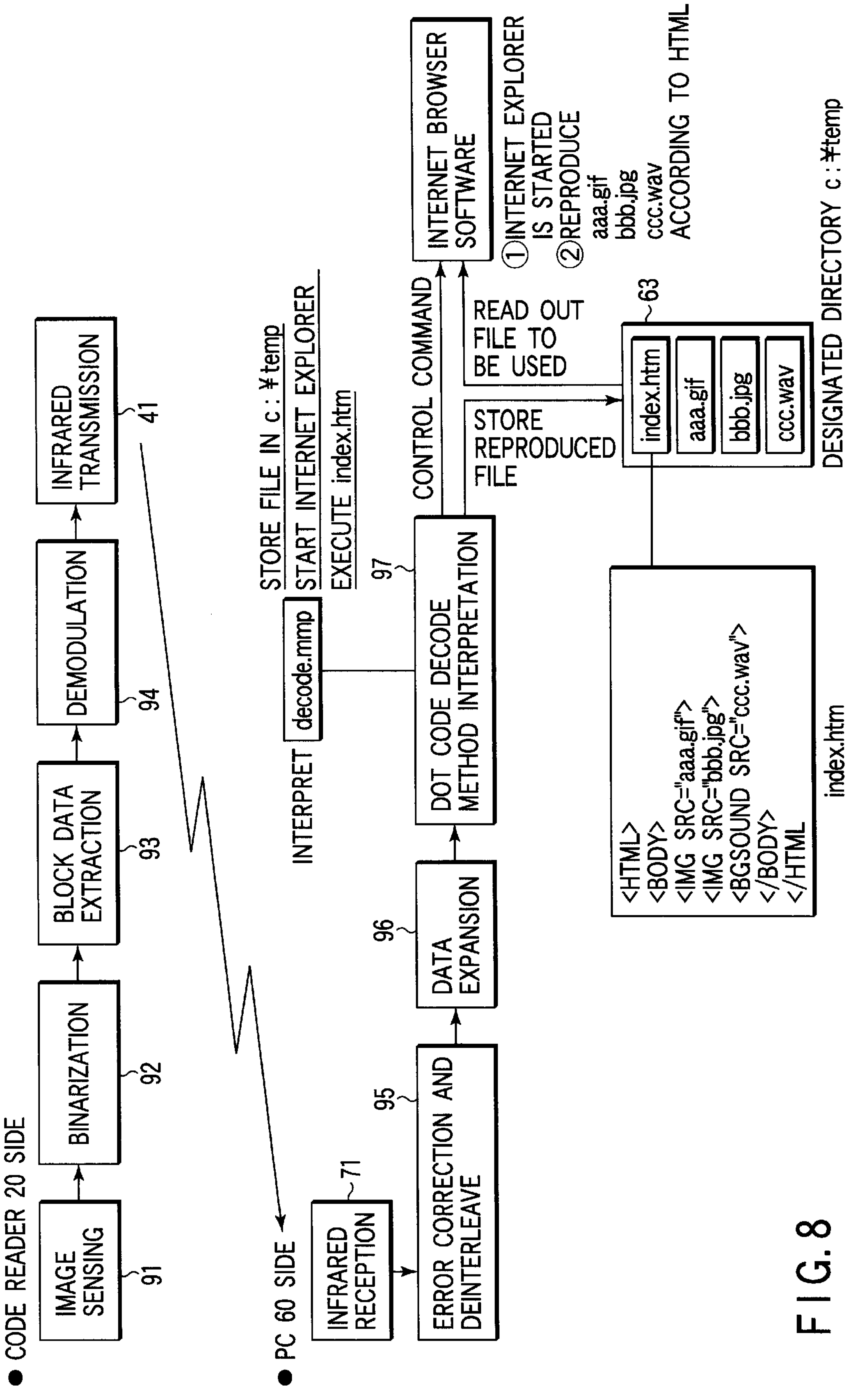
FIG. 8 is a functional block diagram for explaining an example when the code reader sends demodulated data to the PC.

When the user manually scans such dot code 11 using the code reader 20, the code reader 20 executes the aforementioned image sensing function 91 to the demodulation function 94, as shown in FIG. 8, and demodulated data is sent to the PC 60 by an infrared transmission function 41 of the infrared unit 40. The PC 60 receives that data by an infrared reception function 71 of the infrared unit 70, and the dot code decode function 61 executes the aforementioned error correction & deinterleave function 95 and data expansion function 96, thus generating the five files contained in the dot code 11.

The dot code decode method interpreter function 97 interprets the dot code decode function file "decode.mmp". and stores the remaining four files in a directory "c:\temp" as the designated directory 63 in accordance with that file. Next, the function 97 starts Internet Explorer Ver. 5.0. The function 97 then executes the file "index.htm" stored in the designated directory 63.

Figure 7:
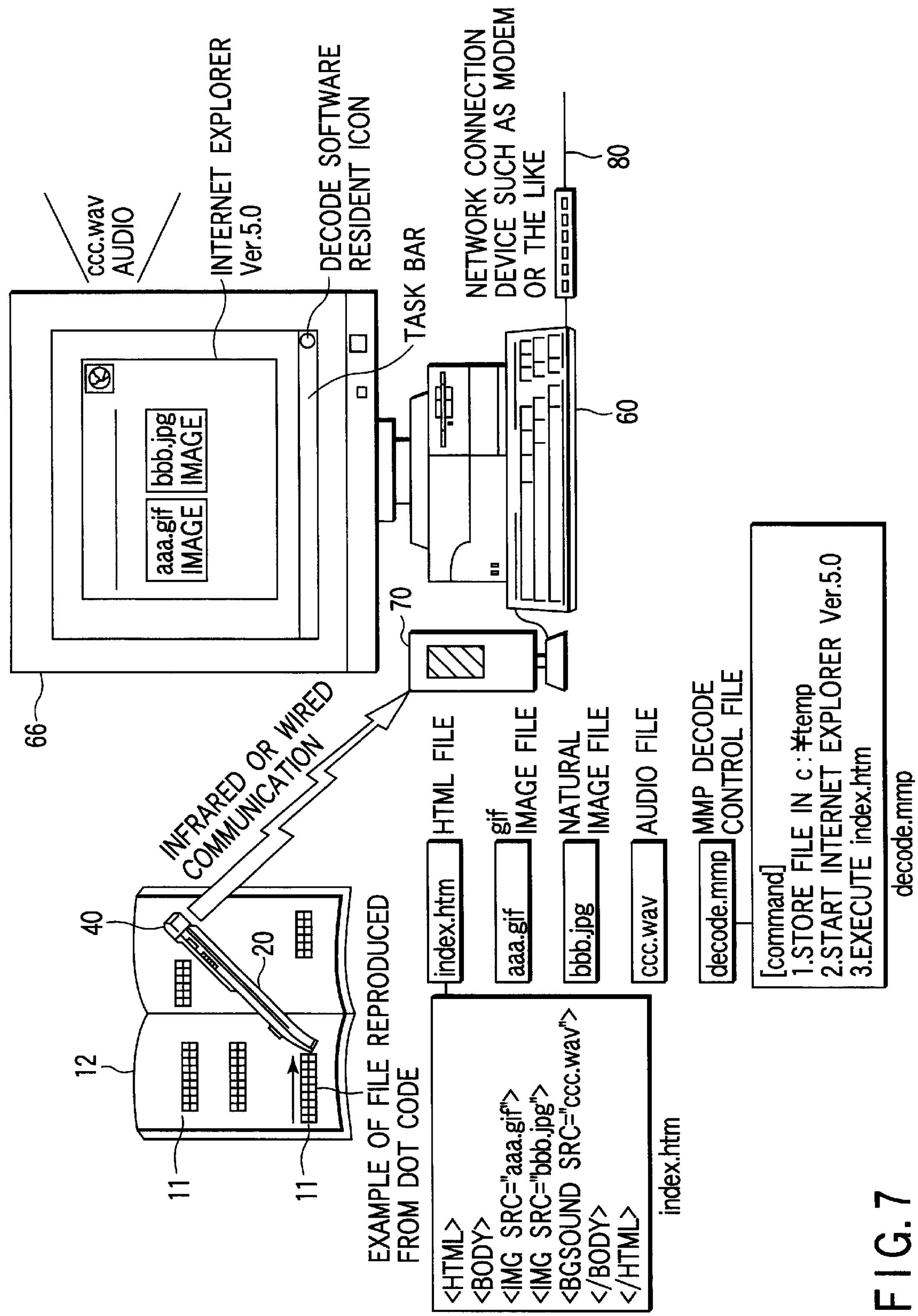
FIG. 7 is a view showing the outer appearance of hardware to explain an example when the code reader sends demodulated data to the PC.

Since this file "index.htm" describes to display the image files "aaa.gif" and "bbb.jpg" and to reproduce and output the audio file "ccc.wav" by HTML script, the images of the two image files "aaa.gif" and "bbb.jpg" are displayed on the window of Internet Explorer displayed on a monitor 66 of the PC 60, and the audio file "ccc.wav" is output as audio via a loudspeaker, as shown in FIG. 7.

If HTML script is used, it can designate read or the like of data stored in a CD-ROM set in the PC 60, therefore, a movie (AVI) file in the CD-ROM can be read out and reproduced, as shown in FIG. 9.

Figure 10:
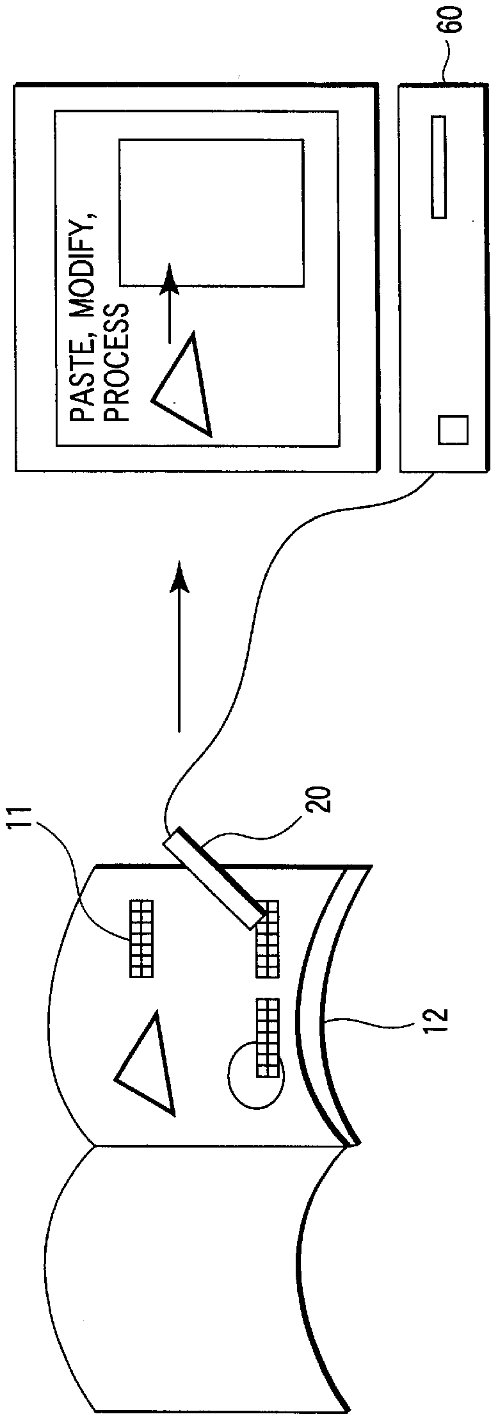
FIG. 10 is a view for explaining an example in which draw data is read out and is fetched by application software.

Furthermore, the dot code 11 can contain a draw data file. In this case, the draw data can be passed to designated application software (e.g., wordprocessing software) by the designated method (e.g., passing data to a running program via a clipboard), as the dot code decode control file describes. That is, as shown in FIG. 10, since the user can directly fetch and use an illustration he or she wants to use from an illustration menu book as the paper medium 12 into the PC 60, he or she can easily create a smart wordprocessor document. If a draw data file is stored in a CD-ROM, the user must browse hierarchical folders (directories) leaning on icons and mouse clicks, and such paper medium 12 allows the user to make quicker and easier browsing than the CD-ROM.

Figure 11:
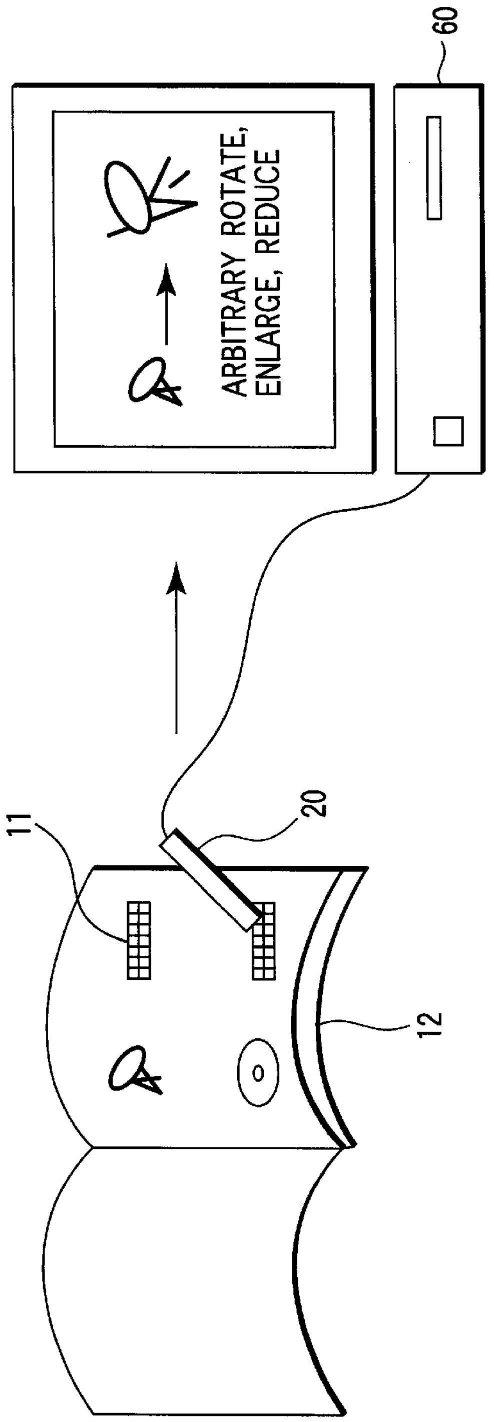
FIG. 11 is a view for explaining an example in which three-dimensional CAD parts data is read out and is fetched into application software of a CAD system.

The dot code 11 may contain a CAD data file. In this case, the CAD data can be passed to designated application software such as a CAD system or the like by a designated method as the dot code decode control file describes. More specifically, as shown in FIG. 11, since the user can directly fetch and use the parts he or she wants to use from a (three-dimensional) CAD parts data book as the paper medium 12, quicker CAD design is achieved. Since a file name or the like is input by searching and confirming from a menu book in the conventional system, quicker and easier input can be made than the conventional system.

Note that the dot code decode function 61 can be provided as dedicated application software, but may be built in a versatile application or OS in the form of a library or plugin when it is used.

An apparatus that executes the dot code decode function 61 is not limited to the PC 60, but includes all apparatuses such as a television receiver called net TV with an Internet browsing function, a settop box, a home game machine, and the like, that can install application software which implements the dot code decode function.

The code reader 20 and PC 60 may be connected via other cables such as a USB cable and the like in place of the RS232C cable 50, and a wireless communication is not limited to an infrared communication using the infrared units 40 and 70.

[Second Embodiment]

The second embodiment of the present invention will be described below.

In the second embodiment, Web contents are printed as a dot code 11, and are reproduced/used on a Web browser.

Figure 12:
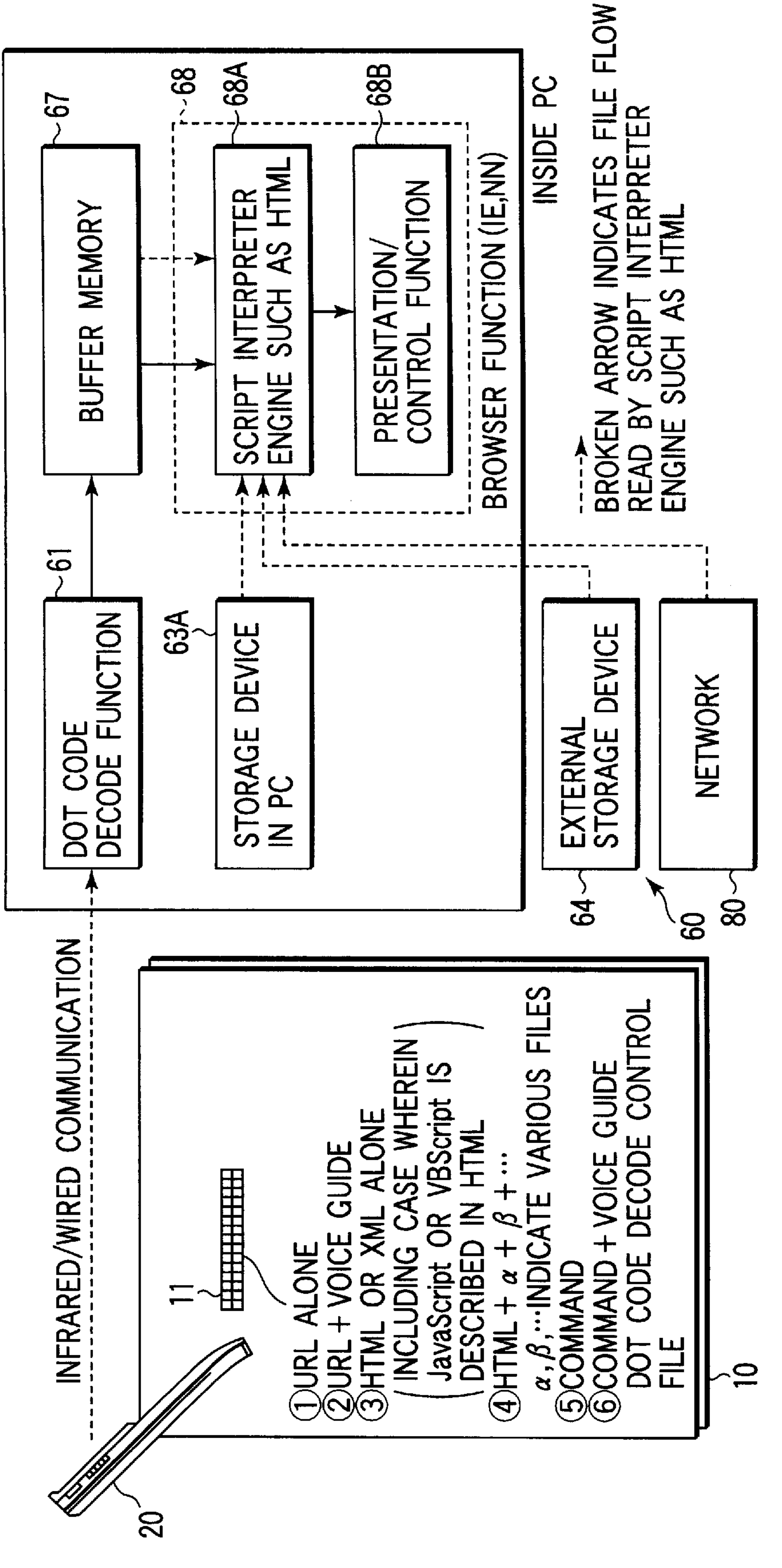
FIG. 12 is a diagram showing the arrangement according to the second embodiment of the present invention.

That is, as shown in FIG. 12, the dot code 11 can contain a URL, or an URL and an audio file for voice guide, in addition to a dot code decode control file. Also, the dot code 11 can include an HTML or XML file, or an HTML file and other files (including an audio file, text file, image file, and the like). Furthermore, the dot code 11 can include a command, or a command and an audio file for voice guide. Note that the HTML or XML file can include a description of a Java script (Sun Microsystems, Inc.), a VB script (Microsoft Corp.), or other scripts.

Note that the audio file stored in the dot code 11 is reproduced as a voice operation guide in response to an input command or URL, or is reproduced by a standalone code reader which is exclusively used to reproduce audio data. In this case, the reproduction method of the audio file can be described in the dot code decode control file.

The command or URL itself can be included in the dot code decode control file. In this case, a plurality of commands can be provided per scan.

When such dot code 11 is manually scanned by the code reader 20, image data, demodulated data, or expanded data of the dot code 11 is input from the code reader 20 to the PC 60 via infrared or wired communications as in the first embodiment.

In the PC 60, the dot code decode function 61 reproduces original files from the input image data, demodulated data, or expanded data, and stores them in a buffer memory 67. A script interpreter engine 68A and other script interpreter engines such as HTML and the like provided as functions of Internet Explorer (IE) or Netscape Navigator (NN) available from Netscape Communications interpret one of (a plurality of) HTML files stored in the buffer memory 67, read out or compute a file or files in the buffer memory 67, a file or files in an internal storage device 63A of the PC or external storage device 64, or a file or files on the network 80, and present data on a browser window by a presentation/control function 68B, in accordance with descriptions of an HTML script and a Java script, VB script, and the like described in that HTML script. When IE or NN as a versatile Web browser is used, another application software, an external device, or the OS can be controlled based on the descriptions of such scripts. A form described in an HTML file or a browser function 68 itself can be controlled by commands.

Note that the dot code decode function 61 can designate browser software or its version to be started, and can determine priority.

Also, materials in the dot code 11, in the internal and external storage devices 63A and 64 of the PC 60, and on the network 80 can be arbitrarily read out and presented in accordance with the description of a script file as one of the files stored in the dot code 11.

Figure 13:
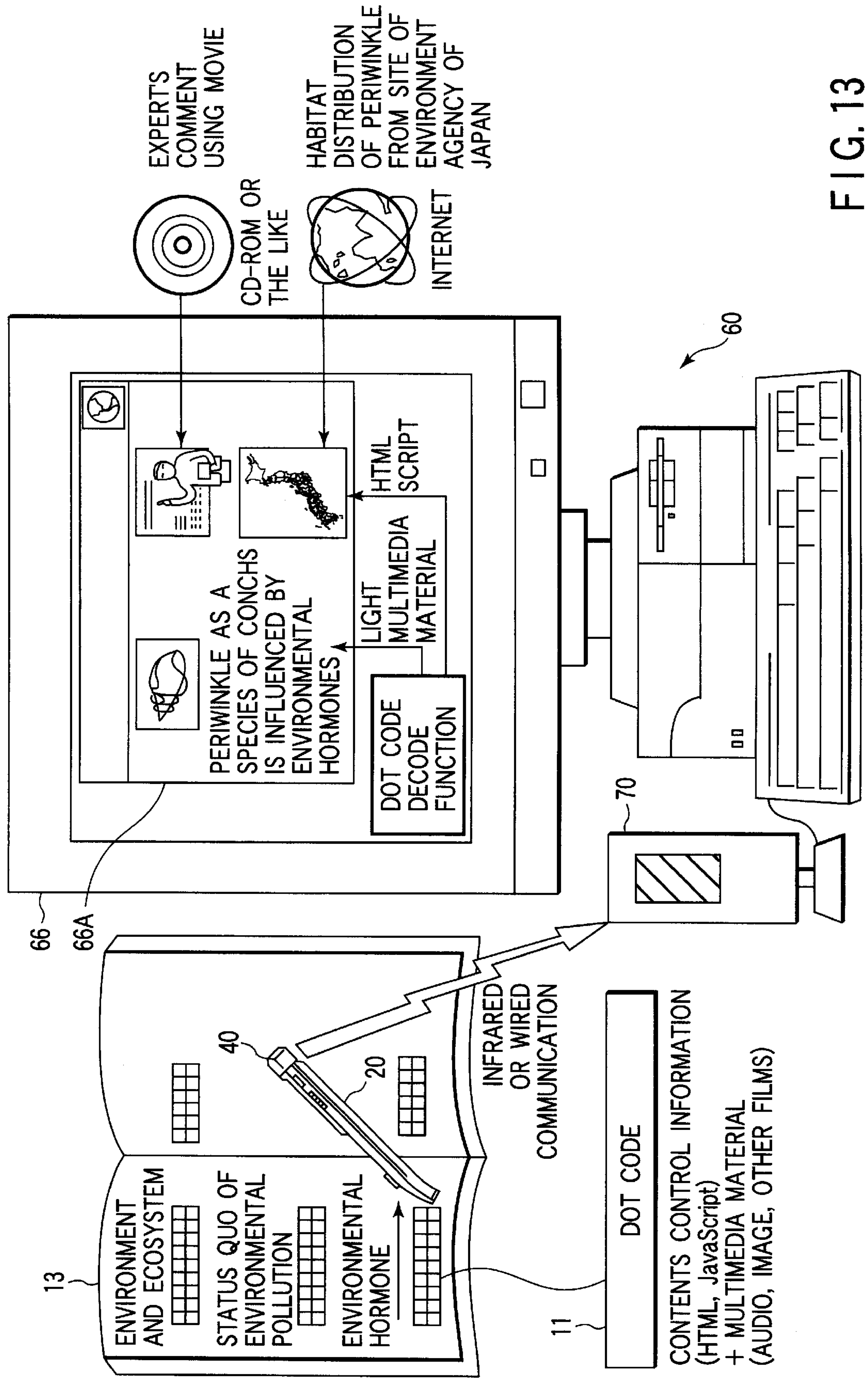
FIG. 13 is a view for explaining a use state when the second embodiment is applied to multimedia teaching materials/education services.

For example, as shown in FIG. 13, a learning magazine 13 with a CD-ROM as the recording medium 10 can store contents control information (HTML and Java scripts) and multimedia materials (audio files, image files, and the like) as dot codes 11, and a CD-ROM can record comments of experts as movies. A browser window 66A on the monitor 66 of the PC 60 can display detailed comments using movies obtained from the CD-ROM and required materials downloaded from a given Internet site in addition to light multimedia materials obtained from the dot codes 11.

With such multimedia teaching materials/education services, since the user can study mainly using books and prints, he or she can concentrate on paper-based study, and can enjoy interaction via the Internet, and pleasure and simplicity of multimedia as needed.

A child who cannot use the PC 60 can use the Internet and multimedia by tracing the dot codes 11 using the code reader 20.

Furthermore, a multimedia title can be easily realized with low cost. That is, ideal teaching materials that selectively use features of each of paper, the Internet, and CD-ROM media can be provided, and timely and flexible services can be provided by each issue. Moreover, low-cost multimedia teaching materials using the Internet or dot codes 11 alone can be provided.

Also, interactive teaching materials can be provided. That is, interactive teaching materials that can be used by only selecting menu items on the sheet surfaces can be provided, and various devises that attract readers can be included.

Using the second embodiment, text and commands can be input to a form on a home page using a command list on the sheet surface to implement various operations.

For example, as shown in FIG. 14, commands are recorded on the recording medium 10 as dot codes 11, and text menu items indicating the command contents are printed near these dot codes 11. When the user scans the corresponding dot code 11 using the code reader 20, text input, selection of a button, check box, and selection value in a selection area, and depression of a button on the Web window 66A are executed to consequently execute control and data input of a Java program, external apparatus, versatile application software, OS, server, another client machine, and the like.

When the second embodiment is applied to an Internet mail-order system, practical effects can be provided.

For example, as shown in FIG. 15, each dot code 11 on an Internet mail-order catalog as the recording medium 10 includes contents control information as a dot code decode control file, and multimedia materials (URL, HTML, Java scripts, audio files, image files, text files, and the like). Data sent from the code reader 20 that scans such dot code 11 via infrared or wired communications is decoded by a digital settop box or game machine 100 that incorporates a dot code decode function, and a Web browser 111 displayed on a home television receiver 110 connected to the digital settop box or game machine 100 presents the decoded multimedia materials. Of course, such display can be similarly made on the aforementioned PC 60.

At this time, not all product images and the like to be presented need be recorded as dot codes 11, and a script that downloads and displays detailed and latest information from a site of each company or the like need only be recorded, as shown in FIG. 15. Therefore, each dot code 11 does not require a large area, and no mail-order home page need be built.

More specifically, the publisher side of an Internet mail-order catalog 14 allows the end user to browse a home page present only on the sheet surface of the catalog or a magazine using the Web browser 111, and can execute various programs using Java scripts, thus greatly reducing the load on a WWW server.

The user can obtain the following effects. That is, since the user can download latest information (e.g., price information or the like) of products from sites of a plurality of companies at the scan timing of a code on the sheet surface and can lay out such information in the form of a table, and he or she can add comments such as comparison/evaluation results of products of respective companies on the book, the user can acquire the latest information at the timing he or she wants to purchase while comparing the acquired information within a page without accessing a plurality of sites, and can directly access an order form page from that page.

FIG. 16 shows a page of a mail-order form 112. Command input to this order form can be made by only scanning the dot code 11 printed on an input page to the form of the Internet mail-order catalog 14. At this time, personal information such as a name, address, and ID can be input by scanning a dot code on a membership card 15 distributed in advance to the user.

Figure 17:
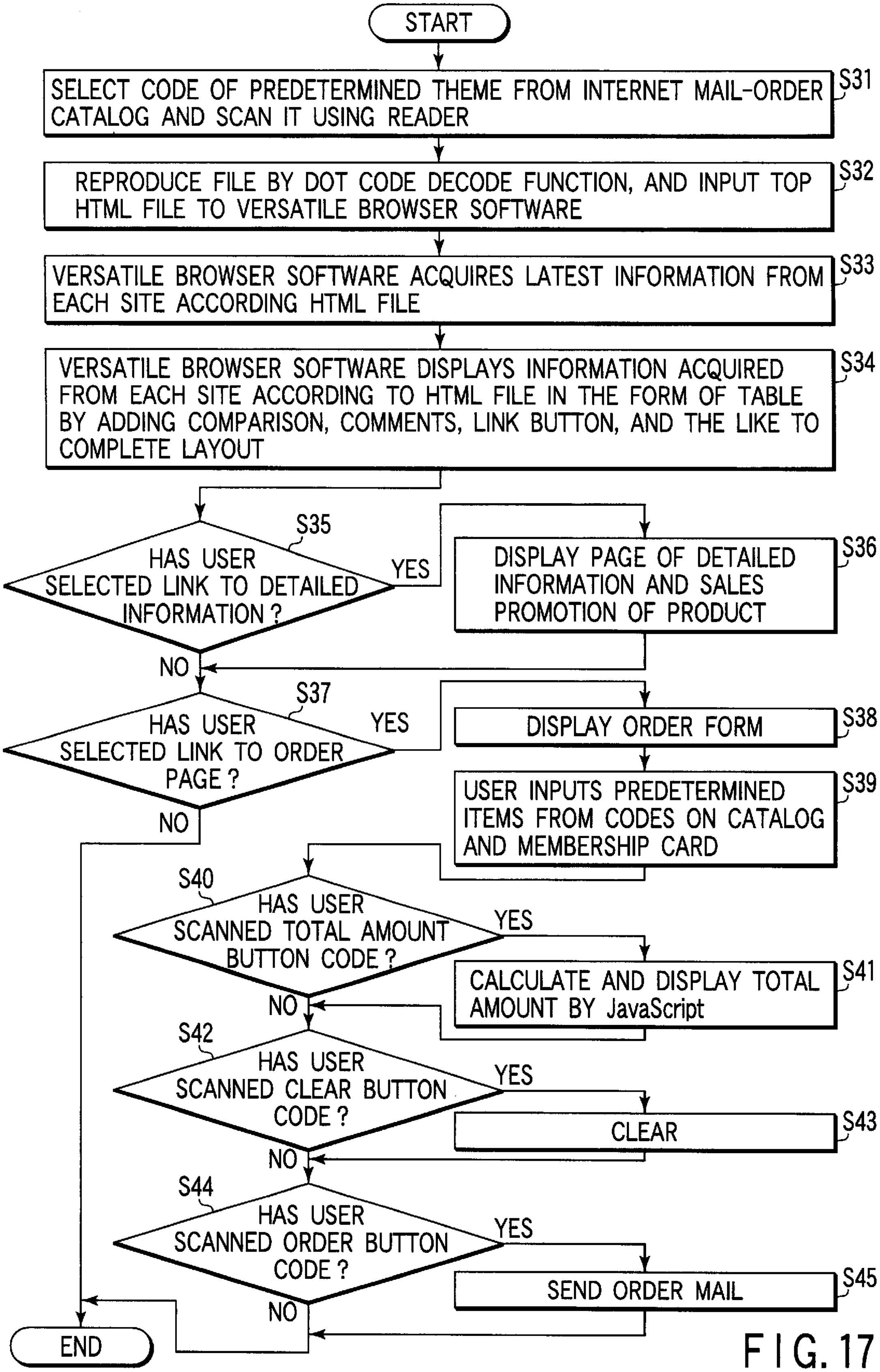
FIG. 17 is a flow chart for explaining the flow of the Internet mail-order service.

FIG. 17 is a flow chart showing the flow of such Internet mail-order system.

More specifically, if the user selects a dot code 11 of a predetermined theme from the Internet mail-order catalog 14 and scans it using the code reader 20 (step S31), the PC 60 or the digital settop box or game machine 100 decodes files recorded as the dot code 11 using the dot code decode function, and inputs a top HTML file of those files to versatile browser software (step S32). The top HTML file defines a page for downloading a plurality of images from different sites for the purpose of comparing them.

The versatile browser software acquires latest information from each site according to the top HTML file (step S33), lays out information acquired from the respective sites in the form of a table, adds comparisons, comments, links, buttons, and the like, and displays a complete layout (step S34).

After that, if the user selects a link to detailed information (step S35), the browser software displays a detailed information/sales promotion page of that product (step S36). In this case as well, information is acquired according to an HTML file that is decoded from the dot code 11 and presents each product in detail, and is displayed in a given layout, as in steps S33 and S34.

If the user selects a link to an order page (step S37), an order form 112 is displayed in accordance with an HTML file of the order form which is decoded from the dot code 11 and includes a Java script (step S38). The user then inputs required items from the dot codes 11 on the Internet mail-order catalog 14 and membership card 15 (step S39). If the user scans a dot code 11 of a total amount button (step S40), the Java script included in the HTML file of the order form computes and displays the total amount (step S41). If the user scans a dot code 11 of a clear (cancel) button (step S42), the required items input in step S39 are cleared (step S43). If the user scans a dot code 11 of an order button (step S44), an order mail including the input required items is submitted (step S45).

When audio files are added to the dot codes of the clear button and order button, voice messages such as "your inputs are cleared" or "your order is placed" can be reproduced and output.

[Third Embodiment]

The third embodiment of the present invention will be described below.

The third embodiment is used in environment setups or the like of the PC 60.

Figure 18:
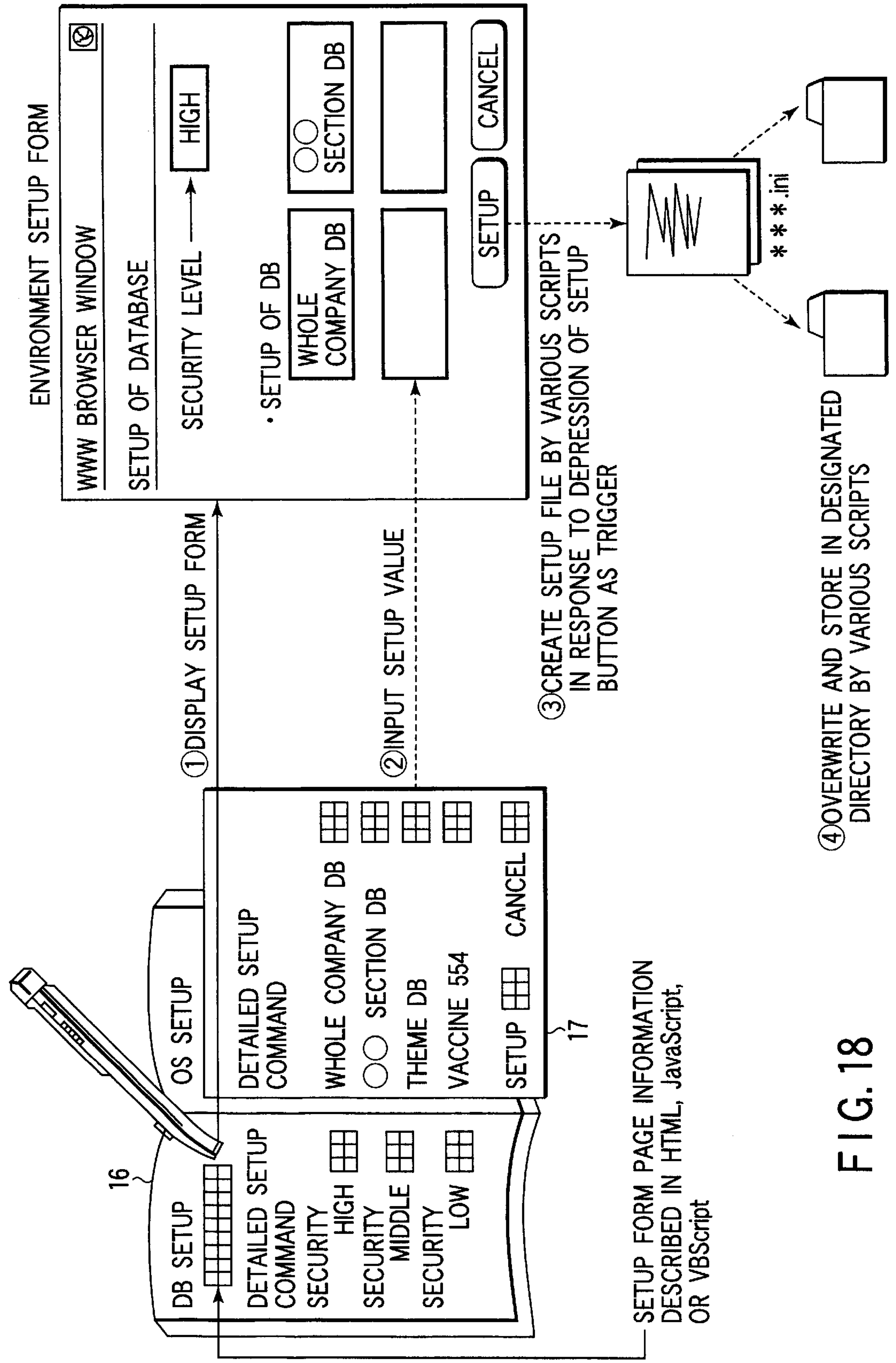
FIG. 18 is a view for explaining a use state when the third embodiment of the present invention is applied to PC environment setups.

For example, as shown in FIG. 18, setup form information described by HTML, Java scripts, VB scripts or the like, or including Java applets together is recorded as each dot code 11 on a manual 16 as the recording medium 10. Also, unique information for each user is recorded as dot codes on a setup sheet 17 printed as the recording medium 10 by the system administrator in units of users. The user scans a dot code 11 on the manual 16 using the code reader 20 to display an environment setup form on a Web browser, and scans a dot code 11 on the setup sheet 17 to input setup values. When the user scans a dot code 11 corresponding to a setup button on the setup sheet 17, a "setup" button on the environment setup sheet is pressed and various scripts generate a setup file (***.ini) in response to depression of that button as a trigger. The generated setup file is overwritten and stored in a designated directory by various scripts included in the dot code 11 on the manual 16. Alternatively, in some environments of the OS and the like, control contents described in a dot code 11 are executed by only scanning the dot code 11 and can be used in PC environment setups and the like.

When this embodiment is used in such PC environment setups, the user need only trace setup contents from the manual 16 edited in correspondence with the user's level and purpose and the setup sheet 17 printed out by the system administrator, and the environment of the system and applications of the PC 60 can be set.

Even when a single machine is shared by a plurality of users, a given user can use that machine in his or her specific environment by tracing the setup sheet 17 in units of users every time he or she uses the machine.

Furthermore, an apparatus which is to undergo environment setups is not limited to the PC 60. For example, setup information of an apparatus such as a telephone set, digital camera, printer, home server, or the like, which is to undergo environment setups, is recorded as dot codes 11 on the manual 16 of that apparatus. The apparatus which is to undergo environment setups executes control contents described in the dot code 11 to set its environment (for example, to set an automatic answering function for the telephone set, power saving management function, air-conditioning management function, and the like for the home server).

Figure 19:
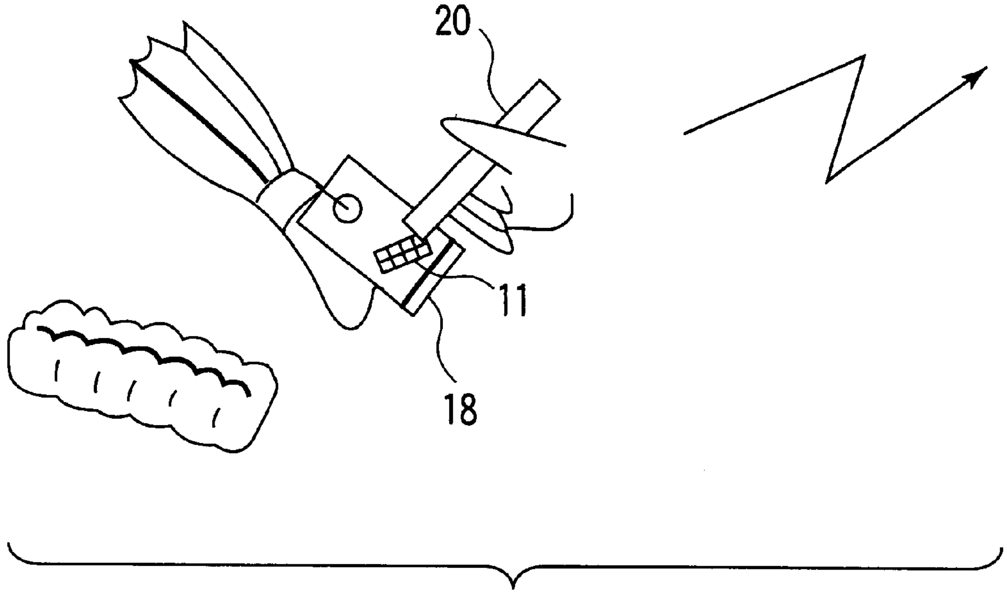
FIG. 19 is a view for explaining a use state when the third embodiment is applied to environment setups of a refrigerator or microwave oven.

As shown in FIG. 19, when environment setup information is recorded as a dot code 11 on a product tag 18 as the recording medium 10, a freezing method in a refrigerator or a thawing method in a microwave oven can be set, thus setting optimal freezing/thawing methods in correspondence with the characteristics of different food items. The dot code 11 may be recorded on a product package, the product itself, a receipt, or the like in place of the product tag 18.

[Fourth Embodiment]

The fourth embodiment of the present invention will be described below.

Figure 20:
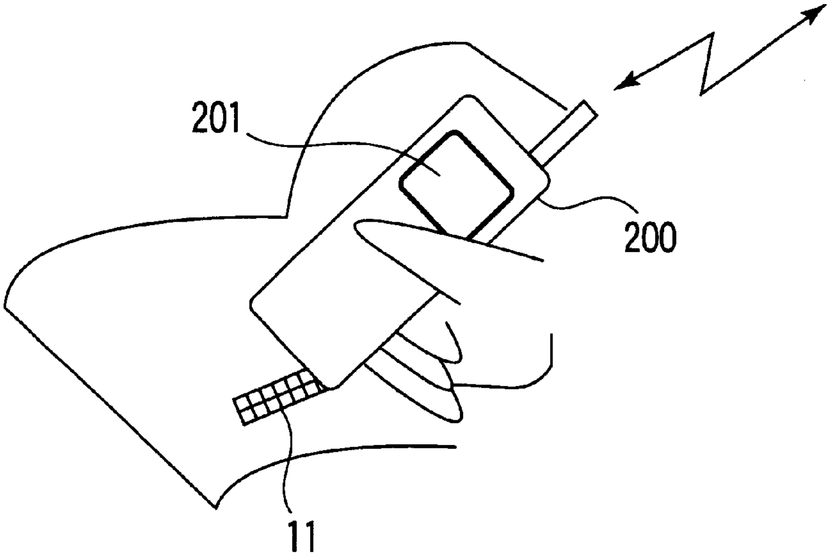
FIG. 20 shows a portable phone/PDA to which the fourth embodiment of the present invention is applied.

In recent years, a portable phone that incorporates a Web browser and a compact communication apparatus called a PDA which comprises a communication function have been prevalently used. As shown in FIG. 20, such portable phone/PDA 200 has only a small display screen 201, and is used to browse dedicated Web sites which are built for such small display screen 201 more frequently than versatile Web sites.

In the fourth embodiment, when HTML that displays a versatile Web site on the display screen 201 to have an optimal size is recorded in a dot code 11, the contents of such Web site can be displayed in correspondence with the screen size of the portable phone/PDA 200.

More specifically, an external apparatus which processes digital information in accordance with an application program is the portable phone/PDA 200, the application program which is running is Web browser software, and the data file contents are a HTML file.

In FIG. 20, the portable phone/PDA 200 has a function of the code reader 20.

As an example of the fourth embodiment, the following use method is available. That is, by scanning a dot code 11 arranged on a map as the recording medium 10 which is provided in the form of a map, the portable phone/PDA 200 accesses and controls a Web camera, which is positioned in the point on the map, to display the state of a road or pleasure resort corresponding to the scanning point, or to display the state in the store or warehouse or that of employees. Also, by scanning a dot code 11 on the recording medium 10 which is provided in the form of a map or local guidebook, the general weather situation on the weather forecast of that location may be displayed. Alternatively, by scanning a dot code 11 on the recording medium 10 provided in the form of a business magazine, the latest stock price chart can be displayed. Furthermore, by scanning a dot code 11 on the recording medium 10 provided in the form of an event information magazine, timetable, or travel guidebook, vacancy information of a concert, the Shinkansen or airline, or a hotel can be displayed. Moreover, by scanning a dot code 11 on the recording medium 10 provided in the form of a contents guidebook, advertisement, leaflet, or the like, movie contents can be displayed. In addition, by scanning a dot code 11 on the recording medium 10 provided in the form of a product catalog, advertisement, leaflet, or the like, the latest product image or detailed product image (an image used VRLM and the like) can be displayed.

The data file contents may be a plurality of HTML files. That is, by recording HTML links from which versatile Web sites link to contents to be displayed on the screen in an optimal size, the total area of codes with respect to the recording medium, i.e., a print, can be reduced.

As an example of such case, as shown in, e.g., FIG. 21, by scanning a dot code 11 on the recording medium 10 provided in the form of a magazine or guidebook, an HTML file of the first layer is displayed on the display screen 201. When the user presses a button on the portable phone/PDA 200 corresponding to a desired number, a corresponding one of HTML files in the second layer, which are decoded from the dot code 11 and stored in an internal memory is displayed on the display screen 201. Furthermore, when the user presses a button corresponding to a desired number, information is downloaded from a corresponding Web site, and is displayed on the display screen 201 in an optimal size.

On the other hand, the data file contents may be Java applets (class files). That is, the user can use and review Java contents offline without accessing any Web site. Demo versions of software are distributed using CD-ROMs or the like for personal computers, but contents of demo versions cannot be distributed for portable phones. However, using this embodiment, such distribution can be realized.

As an example of such case, the following use method is available. That is, as shown in, e.g., FIG. 22, by scanning a dot code 11 on the recording medium 10 provided in the form of a magazine, game strategy guide, or the like, the user can play demo versions of games or fortune-telling. When the recording medium 10 is provided in the form of a reference book or dictionary, this embodiment can be applied to various simulations such as a learning simulation and the like. When this embodiment is applied to a manual, useful tools for practical calculations, jobs, and everyday life can be provided. When this embodiment is applied to a product catalog or membership card, personal authentication can be implemented.

The present invention has been explained based on the embodiments. However, the present invention is not limited to the above embodiments, and various modifications and changes may be made within the scope of the invention.

For example, in the above embodiments, the code reader 20 is ready to communicate with the PC 60 except that its audio reproduction is in progress. Alternatively, the user may carry the code reader 20 alone to acquire information of a dot code 11 at a place away from the PC 60 or the like, and may send the read data to the PC 60 when a communication with the PC 60 is established later. In such case, if the user who carries the code reader 20 alone finds interesting information of a dot code 11 on a booklet he or she is reading in a living room or at a remote place, he or she stores data by scanning that code using the code reader 20, and sends it to the PC 60 and reviews it thereon when a connection to the PC 60 is established later, or accesses a home page on the Internet if the stored information is, e.g., a home page address. In this manner, since the user who carries the code reader 20 alone can acquire information of a dot code 11 at a place away from the PC 60 or the like to store it in the internal memory (not shown) of the code reader 20, and can send the read data to the PC 60 when a communication with the PC 60 is established later, the user is free from any spatial limitations such as the installation place of the PC 60 and the like, and can acquire information of a dot code 11 anytime he or she wants at a desired location, e.g., in another room or at a remote place.

The internal memory (not shown) of the code reader 20 may have a capacity capable of holding a plurality pieces of information of dot codes 11, or the memory size may be expanded by connecting an external expansion memory unit that can be connected using the communication jack (not shown) which is to receive the infrared unit 40 or RS232C cable 50. Of course, a dedicated terminal for an expansion memory may be added and, in such case, both the expansion memory and communication device can be used at the same time. Alternatively, when the wired communication of the code reader 20 is attached by USB, a corresponding versatile portable memory device may be used. In this case, a large number of pieces of information of dot codes 11 can be stored irrespective of the internal memory size of the code reader 20. An audio reproduction mode and data storage mode may be switched by adding a switching means such as a switch or the like. Alternatively, when the scanned information of a dot code 11 is audio information, the code reader 20 may reproduce the audio information and store the scanned information of the dot code 11 as long as the internal memory size allows. Then, after all data are sent to the PC 60 when the PC 60 is connected later, the contents of the internal memory of the code reader 20 may be cleared. In this case, since the user need not be concerned about switching between the reproduction and storage modes, he or she is free from any operation errors and troublesome operations.

In order to confirm if information of a dot code 11 is surely stored when the code reader 20 alone is used, a confirmation display means (not shown) which is used to confirm may be added to the code reader 20 or the external expansion memory unit. In this case, since some or all contents of the read and stored data are displayed on the confirmation display means, the user can confirm that the data is surely stored. If any read error occurs, the user can scan the information again, thus reducing acquisition errors of information of a dot code 11. Note that the confirmation display means may be of an external type, which can be connected using the communication jack (not shown) used to connect the infrared unit 40 or RS232C cable 50 or a dedicated terminal. In this case, since that means is detached while the code reader 20 is carried or is reproducing audio information, portability and operability upon audio reproduction can be improved.

The gist of the present invention is summarized as follows in addition to the appended claims.

(1) An optically readable information recording medium on which digital information is recorded as a dot pattern defined by a matrix of dots which are recorded by printing, is characterized by recording as the dot pattern digital information which includes:

- control information including at least one of a control program and a parameter which are used to control a receiving apparatus which receives digital information sent from an information reading apparatus that reads the digital information recorded on the information recording medium or an application program which runs on the receiving apparatus; and
- an application data file which is used or reproduced by the receiving apparatus or the application program which runs on the receiving apparatus.

More specifically, since the optically readable information recording medium itself has the control information used to control the receiving apparatus or the application program which runs on the receiving apparatus, and the application data file which is used or reproduced by the receiving apparatus or the application program which runs on the receiving apparatus, the receiving apparatus need not have all control programs, parameters, and application data files which are expected to be used, and the storage area of the receiving apparatus can be effectively used accordingly or can be reduced. In addition, since the setup or operation control instruction of the receiving apparatus or the application program which runs on the receiving apparatus can be done by single operation simultaneously with supply of the application data file, operator's input operation can be efficiently made.

Even when any control programs, parameters, and application data files, which are not held by the receiving apparatus since they are not expected to be used, are required to be used, they can be added and used, thus expanding use scenes and functions.

Furthermore, since the control information and application data file to be used can be supplied in association with each other, the need for input processes such as input, select, search, and the like for associating the control information and application data file to be used except for scanning a code image by the information reading apparatus can be obviated, thus easily associating information.

(2) The optically readable information recording medium cited in (1) is characterized in that the application data file includes a multimedia information file including one or more of image information, audio information, and text information.

More specifically, the need for preparing a plurality of media to be provided or used such as sheet surface information (e.g., a sheet, booklet, or the like) which is provided as a visible medium, and an optical disk, floppy disk, or the like which records multimedia information as digital information provided in association with such sheet surface information can be obviated, thus preventing the user from using them in a wrong combination and from having to re-do the intended job accordingly.

Since the code image can include image information and audio information in addition to text information as information to be provided or used (even when the application data file to be used is not prepared in advance in an external apparatus such as a PC or the like), information can be provided and used more flexibly in various ways.

(3) The optically readable information recording medium cited in (1) or (2) is characterized in that the control information includes a reproduction control file as program information which specifies control contents of the receiving apparatus and makes the apparatus operate.

More specifically, since the control information can be provided and used in the form of a program, fine, flexible, sophisticated, or elaborate control can be done.

A program which is used to improve functions (e.g., version up, debug, addition of functions, and the like) of an application program or the like can be provided.

(4) The optically readable information recording medium cited in (2) or (3) is characterized in that the control information includes the multimedia information which is used by an application program installed on the receiving apparatus.

More specifically, since application data files to be used can be supplied in association with each other, the need for input processes such as setups of the start timings of operations such as input, select, search, layout, display/reproduction, and the like for associating a plurality of application data files to be used can be obviated, and such files can be easily associated irrespective of their media types or locations (storage areas).

(5) The optically readable information recording medium cited in (2) or (4) is characterized in that the multimedia information includes one or more of standard-form text information, template image, and standard-form text audio information.

That is, the user can easily and quickly create and process information by minimum addition, deletion, and modification processes using the standard-form text information (standard-form text, standard-form words, standard-form phrases, and the like), template image (patterns, illustrations, frames, and the like prepared in advance), and standard-form text audio information, in place of creating information from the beginning.

(6) The optically readable information recording medium cited in any one of (1) to (5) is characterized in that the control information includes layout information and order information used by an application program of the receiving apparatus.

That is, since the need for labor, and trial and error upon laying out information to be used by the user or upon setting up the order, timings, and the like of processes such as reproduction/display, transmission, operation, and the like can be obviated, and even a user who is not accustomed to handling of a receiving apparatus such as a PC or the like or edit/creation works can easily and quickly create and process information.

(7) The optically readable information recording medium cited in any one of (1) to (5) is characterized in that the control information includes control information as position information of a location of file information that the application can use.

That is, the user need not search for file information that the application can use.

(8) The optically readable information recording medium cited in any one of (1) to (5) is characterized in that the control information includes control information for Internet connection.

That is, even a user who is not accustomed to Internet connection can easily access the Internet.

(9) An information reading apparatus for reading digital information recorded in an information recording medium as a dot pattern defined by a matrix of dots which are recorded by printing, is characterized by comprising:

restoration means for restoring the read dot pattern to original digital information;

audio reproduction means which can decode and reproduce audio information of the digital information restored by the restoration means;

communication means for sending information to an external apparatus; and communication connection state discrimination means for discriminating a communication connection state with the external apparatus, and when the communication connection state discrimination means determines that a communication with the external apparatus is not connected, a reproduction operation of the audio reproduction means is permitted.

More specifically, even when a communication with the external apparatus is disconnected due to some reasons not intended by the operator, audio information can be acquired.

Since the information reading apparatus not only has a function of an input terminal to the external apparatus but also can be used as a standalone audio player, the user can freely listen to audio information recorded on the information recording medium without being limited by space or time required upon connection with the external apparatus.

(10) The information reading apparatus cited in (9) is characterized in that the communication means is detachable from the information reading apparatus main body.

That is, by detaching the communication means which is not necessary when the information reading apparatus is used as a standalone audio player, the user is free from any spatial limitations (in case of a wired communication), and portability (lightweight and compact size) and operability (lightweight and disconnection of a cable in case of the wired communication) can be improved.

When the communication means is wireless communication means, since no power supply to the communication means is required, power savings and long operation time can be assured.

(11) The information reading apparatus cited in (9) or (10) is characterized in that the information reading apparatus comprises wired communication means having a communication terminal for receiving a detachable signal cable, and when detachable wireless communication means is attached to the communication terminal of the wired communication means, a wireless communication is selected.

That is, the information reading apparatus need not have any exclusive connection terminal for the wireless communication means in addition to that for a wired communication. Since a wired communication which allows a stable information communication immune to the influence of an external environment is normally mainly used, and when the wireless communication means is attached, a wireless communication is selected. Hence, a comfortable and easy read operation environment free from cable connection can be provided.

When the external apparatus as a communication partner has only wireless communication means (when an external apparatus is a note PC, handy PC, portable terminal, portable game machine, or the like), a communication can be made by selecting a wireless communication by attaching the wireless communication means.

(12) A (multimedia) information recording/reproducing system which comprises external information input means, and can record and reproduce any one or more of image information, audio information, and text information, is characterized in that a reproduction process is done in accordance with reproduction control information which is recorded on an optically readable information recording medium and is received by the external information input means.

That is, automatic reproduction can be made by only scanning a code image without requiring any detailed setups of the user.

(13) An information processing method is characterized by comprising the steps of:

sensing a code image recorded by printing by converting digital information into an optically readable pattern image;

converting the sensed code image into digital information;

sending the converted digital information;

receiving the incoming digital information;

converting the received digital information into file data;

storing the converted file data; and passing the stored file data to an application.

That is, since file data is passed to an application to be started when the operator only scans a desired code image using an information reading apparatus, the need for operator's labor, i.e., a series of input/instruction operations for temporarily storing file data on a storage medium, confirming attribute information of the file data, selecting and starting a corresponding application program, and selecting and using the stored file data from the started application can be obviated, and operation errors can be reduced.

(14) An information processing method is characterized by comprising the steps of:

sensing a code image recorded by printing by converting digital information into an optically readable pattern image;

converting the sensed code image into digital information;

sending the converted digital information;

receiving the incoming digital information;

converting the received digital information into file data;

storing the converted file data;

recognizing attribute information of the stored file data;

starting a corresponding application program based on the recognized attribute information; and passing the stored file data to the started application program.

That is, the operator need not start an application program in advance.

Even when the operator does not know an application that the file data recorded as a code image corresponds to or requires, a required application program can be started, and the file data can be used on that application, thus reducing operation errors such as starting of a wrong application program and the like. Alternatively, the need for operator's labor, i.e., a series of input/instruction operations for temporarily storing file data on a storage medium, confirming attribute information of the file data, selecting and starting a corresponding application program, and selecting and using the stored file data from the started application can be obviated, and operation errors can be reduced.

Since an application program that the producer/distributor of file data recorded as a code image intended can be reliably started and used, an application which is uniquely associated in the user's processing apparatus such as a personal computer or the like and is against the distributor's intention can be prevented from being started and used.

(15) A program recording medium for recording a program for making a processor execute an information process including the steps of:

receiving digital data sent from an optical information reading apparatus (having a function of sensing a code image which is recorded by converting digital image into an optically readable pattern image by printing, converting the sensed code image into digital data, and sending the digital data to an external apparatus);

converting the received digital data into file data;

storing the converted file data; and passing the stored file data to an application.

That is, after the program recorded on that program recording medium is installed in a processing apparatus, the operator need only scan a code image using the information reading apparatus, and the processing apparatus itself not only for saves file data in a storage area but also executes a series of processes for passing the file data to a running application. Hence, after the file data is saved in the storage area, the operator need not open that file data from a running application.

(16) An Internet mail-order method for acquiring product information and submitting an order from a terminal via the Internet, is characterized in that the terminal when product information browsing window form information which comprises control information for a product information browsing window display instruction, and home page address information for acquiring product information are input, accesses the home page on the Internet designated by the input home page address, acquires product information, and displays it on the display means, a window of which is designed according to the product information browsing window form information, when order submission process window form information which comprises control information for an order submission window display instruction, and an order submission process request are input,.displays an order window, which is designated according to the order submission process window form information, when order data including customer information, product identification information and a quantity are input, displays the input order data and prompts a customer to confirm the order contents, and when a send instruction of the order data is input, accesses a product order reception system via the Internet and simultaneously sends the order data created by the terminal to the product order reception system via the Internet, and the product order reception system receives the simultaneously sent order data, and executes an order submission process for the customer on the basis of the customer information, product identification information and quantity included in the order data.

That is, a use environment of a window form which is selected by the user and is easy to use can be provided without being restricted by home pages to be accessed and various kinds of different window layouts in units of destinations provided by the product order reception system, thus reducing input errors and the like.

Even when the user acquires product information from a plurality of home pages, he or she need not switch windows, and can easily compare and examine products.

(17) A sheet- or booklet-like information recording medium is characterized by comprising:

code images recorded by respectively converting, into optically readable pattern images by printing, digital data which represent (have) at least a plurality of pieces of payment condition information for selecting a payment method, customer information for clarifying a name, sending address, and contact address of the user who submitted an order, numeral information used to select a quantity, and order submission process window form information comprising control information for an order submission window display instruction; and sheet surface information which visually expresses contents of information recorded in each code image.

That is, since shared information from the product order reception system and the order submission process window form information recorded on the information recording medium can be provided according to the distributor's intention specialized in units of customers without troubling the user, detailed, effective information that each user wants or the distributor wants to inform in units of users can be provided, and the information volume on the home page can be minimized.

A use environment of a window form which is selected by the user and is easy to use can be provided without being restricted by a various kinds of different window layouts in units of access destinations provided from the product order reception system to be accessed, thus reducing input errors and the like.

(18) An optical information recording medium is characterized by comprising:

a first sheet- or booklet-like information recording medium which has at least code images having home page address information used to acquire product information, product identification information, and control information for a sending instruction of code images which are recorded by converting, into optically readable pattern images by printing, digital data which represent (have) home page address information used to acquire product information, address information used to access a product order reception system via the Internet, product identification information containing product additional information, a plurality of pieces of payment condition information for selecting a payment method, customer information for clarifying ordered person identification information (name, ID, or the like), a sending address, and a contact address, numeral information used to select a quantity, order submission process window form information comprising control information for an order submission window display instruction, and control information for a sending instruction, and sheet surface information which visibly expresses contents of information recorded in each code image; and a second sheet- or booklet-like information recording medium which has at least code images respectively having the plurality of pieces of payment condition information for selecting a payment method, customer information for clarifying a name, sending address, and contact address of the person who submitted an order, numeral information used to select a quantity, and order submission process window form information comprising control information for an order submission window display instruction, and sheet surface information which visibly expresses contents of information recorded in each code image.

More specifically, by providing this optical information recording medium to each user, since an order submission condition for each user can be set without being prepared in advance by the product order submission system or many setup items for an order submission process can be input without being input one by one by the user by only scanning code images using the information reading apparatus and sending read data, the information volume and the number of processing steps in the product order reception system can be reduced, or user's order submission process operation can be facilitated.

Since the optical information recording medium is formed independently by the first sheet- or booklet-like information recording medium used upon acquiring product information, and the second sheet- or booklet-like information recording medium which is used upon submitting an order, when new information is provided for one of these first and second information recording medium, the other medium which is not changed can be prevented from being re-provided.

(19) A code image reading apparatus is characterized by reading code images which are recorded by printing by converting, into optically readable pattern images, digital data which represent (have) home page address information used to acquire product information, address information used to access a product order reception system via the Internet, product identification information containing product additional information, a plurality of pieces of payment condition information for selecting a payment method, customer information for clarifying ordered person identification information (name, ID, or the like), a sending address, and a contact address, numeral information used to select a quantity, order submission process window form information comprising control information for an order submission window display instruction, and control information for a sending instruction, converting the read code images into original digital data, and acquiring product information and submitting an order via the Internet.

More specifically, since most of input/select processes for accessing the information sources such as home pages having required product information and the product order reception system and submitting an order can be done by scanning code images and sending the read data, the input efficiency of the operator can be improved, and even an operator who is not accustomed to the operation of a personal computer can easily operate.

(20) An Internet mail-order method for acquiring product information and submitting an order from a terminal via the Internet, is characterized in that a code image reading apparatus which reads code images which are recorded by printing by converting digital data into optically readable pattern images, converting the read code images into original digital data, and acquiring product information and submitting an order via the Internet sequentially reads, from a first sheet- or booklet-like information recording medium having code images recorded by typing or printing by converting, into optically readable pattern images, digital data having at least home page address information used to acquire product information, product identification information including product additional information, and control information for a sending instruction, and sheet surface information which visibly expresses contents of information recorded in each code image, the pattern images having the home page address information used to acquire product information, product identification information including product additional information, and control information for a sending instruction, and sends the read information to the terminal, the terminal when the home page address information used to acquire product information, product identification information including product additional information, and control information for a sending instruction are received from the code image reading apparatus, acquires product information by accessing a corresponding home page on the Internet, and displays the acquired product information together with the product additional information included in the product information input at the code image reading apparatus, the code image reading apparatus reads, from a second sheet- or booklet-like information recording medium having code images which are recorded by typing or printing by converting, into optically readable pattern images, digital data having a plurality of pieces of payment condition information for selecting a payment method, customer information for clarifying a name, sending address, and contact address of the user who submitted an order, numeral information used to select a quantity, order submission process request information comprising order submission process window form information used to display order data including the customer information, product identification information, and numeral information used to select a quantity and control information for an order submission window display instruction, and control information for a sending instruction, and sheet surface information which visibly expresses contents of information recorded in each code image, the code image having the order process request information, and sends the read code image to the terminal, the terminal displays an order submission window in accordance with the order submission process window form information when the order submission process request is input from the code image reading apparatus, the code image reading apparatus reads the code images having the customer information, product information, and numeral information used to select a quantity from the first and second sheet- or booklet-like information recording media in no particular order, and sends the read code images to the terminal, the terminal displays input order data at a predetermined position on an order submission window displayed in accordance with the order submission process window form information when the order data is input from the code image reading apparatus, and prompts the user to confirm the order contents, the code image reading apparatus sequentially reads the code images having the address information used to access the product order reception system via the Internet, and control information for a sending instruction, and sends the read code images to the terminal, the terminal accesses the product order reception system via the Internet in accordance with the input address information used to access the product order reception system via the Internet when the control information for a sending instruction of the order data from the code image reading apparatus, and simultaneously sends the order data created by the terminal to the product order reception system via the Internet, and the product order reception system receives the simultaneously sent order data, and executes an order submission process for a customer on the basis of the customer information, product identification information, and quantity included in the received order data.

That is, since shared information from the product order reception system and the order submission process window form information recorded on the information recording medium can be provided according to the distributor's intention specialized in units of customers without troubling the user, detailed, effective information that each user wants or the distributor wants to inform in units of users can be provided, and the information volume on the home page can be minimized.

Furthermore, since an order submission condition for each user can be set without being prepared in advance by the product order submission system or many setup items for an order submission process can be input without being input one by one by the user by only scanning code images using the information reading apparatus and sending read data, the information volume and the number of processing steps in the product order reception system can be reduced, or user's order submission process operation can be facilitated.

(21) A sheet- or booklet-like information recording medium is characterized by comprising:

at least code images having home page address information used to acquire product information, product identification information, and control information for a sending instruction of code images which are recorded by converting, into optically readable pattern images by typing or printing, digital data which represent (have) product information browsing window form information comprising control information for a product information browsing window display instruction, home page address information used to acquire product information, address information used to access a product order reception system via the Internet, product identification information including product additional information, and control information for a sending instruction; and sheet surface information which visibly expresses contents of information recorded in each code image.

That is, since shared information from the product order reception system and the order submission process window form information recorded on the information recording medium can be provided according to the distributor's intention specialized in units of customers without troubling the user, detailed, effective information that each user wants or the distributor wants to inform in units of users can be provided, and the information volume on the home page can be minimized.

Also, a use environment of a window form which is selected by the user and is easy to use can be provided without being restricted by a various kinds of different window layouts in units of access destinations provided from the product order reception system, thus reducing input errors and the like.

Furthermore, even when the user acquires product information from a plurality of home pages, he or she need not switch windows, and can easily compare and examine the acquired information.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording medium having a portion which records data as an optically readable code, said code comprising:

information for controlling an apparatus that processes digital information in accordance with an application program to designate and start the application program; and a data file which is used by the started application program and which includes a file to be processed in accordance with the started application program.

2. The information recording medium according to claim 1, wherein said data file includes a file which is passed to the started application program, and output in the form of at least one of audio, image and text information.

3. The information recording medium according to claim 1, wherein said data file includes a control file used to control the started application program.

4. The information recording medium according to claim 3, wherein the control file includes a file for implementing at least one of:

control for storing another data file in a predetermined storage device;

control for passing another data file to the started application program;

control for processing another data file in accordance with the started application program; and control of an OS.

5. The information recording medium according to claim 1, wherein said information for designating and starting the application program includes attribute information for designating the application program.

6. The information recording medium according to claim 5, wherein the attribute information includes an extension corresponding to the application program.

7. An information recording medium having a portion which records data as an optically readable code, said code comprising:

a control file for designating and controlling an application program in an apparatus which processes digital information in accordance with the application program; and a data file processed in accordance with the designated application program;

wherein said control file includes a file for implementing at least one of:

control for designating and starting the application program;

control for storing said data file in a predetermined storage device;

control for passing said data file to the designated application program;

control for processing said data file in accordance with the designated application program; and control of an OS.

8. The information recording medium according to claims 7, wherein said data file includes a file which is passed to the designated application program, and output in the form of at least one of audio, image and text information.

9. The information recording medium according to claim 7, wherein said control file includes attribute information for designating the application program.

10. The information recording medium according to claim 9, wherein the attribute information includes an extension corresponding to the application program.

11. An information processing method for optically reading a code from an information recording medium, said code including information for controlling an apparatus that processes digital information in accordance with an application program to designate and start the application program, and a data file used by the started application program, and said method comprising:

optically reading said code;

reproducing said information for designating and starting the application program and said data file from the read code;

designating and starting a corresponding application program in accordance with the reproduced information for designating and starting the application program; and passing the reproduced data file to the started application program.

12. An information processing apparatus for optically reading a code from an information recording medium, said code including information for controlling an apparatus that processes digital information in accordance with an application program to designate and start the application program, and a data file used by the started application program, and said apparatus comprising:

reading means for optically reading said code;

reproduction means for reproducing said information for designating and starting the application program and said data file from said read code;

starting means for designating and starting a corresponding application program in accordance with said reproduced information for designating and starting the application program; and means for passing the reproduced data file to the started application program.

13. A computer readable program recording medium which stores a program for making a computer execute:

a process for optically reading a code from an information recording medium, said code including information for controlling an apparatus that processes digital information in accordance with an application program to designate and start the application program, and a data file used by the started application program;

a process for reproducing said information for designating and starting the application program and said data file from the read code;

a process for designating and starting a corresponding application program in accordance with the reproduced information for designating and starting the application program; and a process for passing the reproduced data file to the started application program.

14. An information processing method for optically reading a code from an information recording medium, said code including a control file for designating and controlling an application program in an apparatus which processes digital information in accordance with the application program, and a data file processed in accordance with the designated application program, and said method comprising:

optically reading said code;

reproducing said control file and said data file from the read code;

designating and controlling a corresponding application program in accordance with the reproduced control file; and passing the reproduced data file to the controlled application program.

15. An information processing apparatus for optically reading a code from an information recording medium, said code including a control file for designating and controlling an application program in an apparatus which processes digital information in accordance with the application program; and a data file processed in accordance with the designated application program, and said apparatus comprising:

reading means for optically reading said code;

reproduction means for reproducing said control file and said data file from said read code;

control means for designating and controlling a corresponding application program in accordance with said reproduced control file; and means for passing the reproduced data file to the application program controlled by said control means.

16. A computer readable program recording medium which stores a program for making a computer execute:

a process for optically reading a code from an information recording medium, said code including a control file for designating and controlling an application program in an apparatus which processes digital information in accordance with the application program, and a data file processed in accordance with the designated application program;

a process for reproducing said control file and said data file from the read code;

a process for designating and controlling a corresponding application program in accordance with the reproduced control file; and a process for passing the reproduced data file to the controlled application program.

17. The information processing method according to claim 11, wherein said information for designating and starting the application program includes an extension.

18. The information processing apparatus according to claim 12, wherein said information for designating and starting the application program includes an extension.

19. The computer readable program recording medium according to claim 13, wherein said information for designating and starting the application program includes an extension.

20. The information processing method according to claim 14, wherein said control file for designating and controlling the application program includes an extension.

21. The information processing apparatus according to claim 15, wherein said control file for designating and controlling the application program includes an extension.

22. The computer readable program recording medium according to claim 16, wherein said control file for designating and controlling the application program includes an extension.

* * * * *